(12) United States Patent
Sgarz et al.

(10) Patent No.: US 10,401,532 B2
(45) Date of Patent: Sep. 3, 2019

(54) LOCATION DEVICE AND METHOD FOR OPERATING A LOCATION DEVICE

(71) Applicant: Robert Bosch GmbH, Stuttgart (DE)

(72) Inventors: Heiko Sgarz, Leonberg (DE); Jan-Michael Brosi, Leinfelden-Echterdingen (DE); Tobias Zibold, Stuttgart (DE); Christian Amann, Stuttgart (DE); Sebastian Jackisch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/321,980

(22) PCT Filed: Jun. 25, 2015

(86) PCT No.: PCT/EP2015/064430
§ 371 (c)(1),
(2) Date: Dec. 23, 2016

(87) PCT Pub. No.: WO2015/197779
PCT Pub. Date: Dec. 30, 2015

(65) Prior Publication Data
US 2017/0131426 A1    May 11, 2017

(30) Foreign Application Priority Data
Jun. 25, 2014  (DE) ........................ 10 2014 212 131

(51) Int. Cl.
*G01V 9/00* (2006.01)
*G01V 8/00* (2006.01)
(Continued)

(52) U.S. Cl.
CPC .............. *G01V 9/00* (2013.01); *G01C 15/02* (2013.01); *G01V 3/10* (2013.01); *G01V 3/17* (2013.01);
(Continued)

(58) Field of Classification Search
CPC ... G01V 9/00; G01V 3/10; G01V 3/17; G01V 3/175; G01V 8/005; G01C 15/02; G06K 9/22; G06T 11/60
See application file for complete search history.

(56) References Cited

U.S. PATENT DOCUMENTS

| 2004/0107017 A1* | 6/2004 | Hoffmann | G01V 3/15 700/98 |
| 2013/0182167 A1* | 7/2013 | Haldner | G01V 3/165 348/333.05 |

FOREIGN PATENT DOCUMENTS

| CN | 1475813 A | 2/2004 |
| CN | 1500215 A | 5/2004 |

(Continued)

OTHER PUBLICATIONS

International Search Report corresponding to PCT Application No. PCT/EP2015/064430, dated Sep. 22, 2015 (German and English language document) (5 pages).

*Primary Examiner* — Utpal D Shah
(74) *Attorney, Agent, or Firm* — Maginot, Moore & Beck LLP

(57) ABSTRACT

An imaging locating device includes a first locating apparatus, a position sensor, and an evaluation apparatus. The first locating apparatus is configured to detect locating data in relation to objects to be located. The objects are concealed under an examination surface. The position sensor is configured to detect position data of the locating device in relation to the examination surface. The evaluation apparatus is configured to determine a first at least two-dimensional map information items by assigning the locating data of a first category from the first locating apparatus to the position data. The evaluation data is further configured to determine at least one further at least two-dimensional map information item. The at least one further at least two-dimensional (Continued)

map information item differs from the first at least two-dimensional map information item.

17 Claims, 7 Drawing Sheets

(51) Int. Cl.
| | | |
|---|---|---|
| *G06K 9/22* | (2006.01) | |
| *G06T 11/60* | (2006.01) | |
| *G01C 15/02* | (2006.01) | |
| *G01V 3/17* | (2006.01) | |
| *G01V 3/175* | (2006.01) | |
| *G01V 3/10* | (2006.01) | |
| *G01V 3/15* | (2006.01) | |

(52) U.S. Cl.
CPC .............. *G01V 3/175* (2013.01); *G01V 8/005* (2013.01); *G06K 9/22* (2013.01); *G06T 11/60* (2013.01); *G01V 3/15* (2013.01); *G06K 2209/09* (2013.01)

(56) References Cited

FOREIGN PATENT DOCUMENTS

| CN | 201434667 Y | 3/2010 |
|---|---|---|
| DE | 10 2006 025 861 A1 | 12/2007 |
| DE | 10 2011 079 258 A1 | 1/2013 |
| WO | 03/067284 A1 | 8/2003 |

\* cited by examiner

Fig. 6
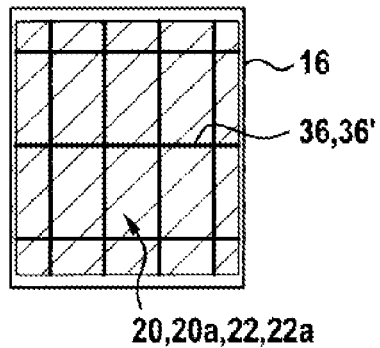
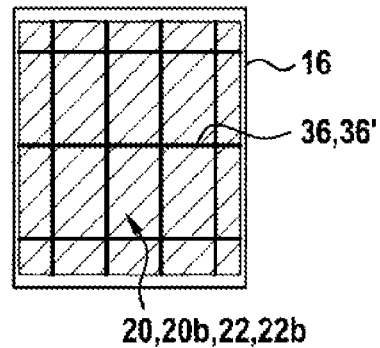
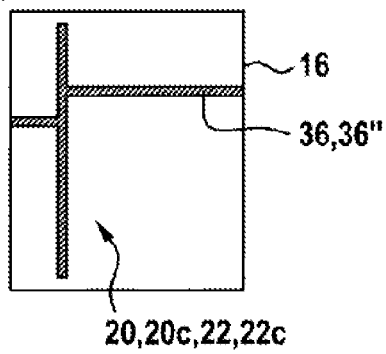
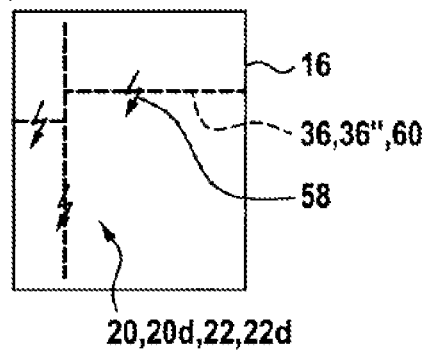
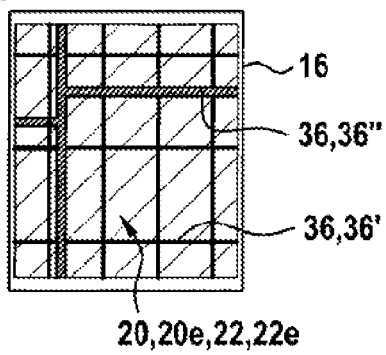
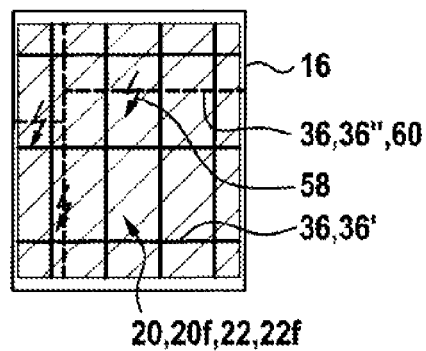

LOCATION DEVICE AND METHOD FOR OPERATING A LOCATION DEVICE

This application is a 35 U.S.C. § 371 National Stage Application of PCT/EP2015/064430, filed on Jun. 25, 2015, which claims the benefit of priority to Serial No. DE 10 2014 212 131.0, filed on Jun. 25, 2014 in Germany, the disclosures of which are incorporated herein by reference in their entirety.

BACKGROUND

DE 10 2006 025 861 A1 has already proposed a locating device for locating objects in an examination article, which is provided in conjunction with an output unit for outputting an information item on the basis of a movement characteristic.

SUMMARY

The disclosure proceeds from an imaging locating device, more particularly a hand-held locating device, comprising at least a first locating apparatus, provided to detect locating data in relation to objects to be located which are concealed under an examination surface, a position sensor for detecting position data of the locating device in relation to the examination surface, and an evaluation apparatus, provided to determine a first at least two-dimensional map information item by assigning locating data of a first category from the first locating apparatus to position data.

The proposition is made that the evaluation apparatus is provided to determine at least one further at least two-dimensional map information item which differs from the first at least two-dimensional map information item.

The imaging locating device, in particular a hand-held locating device, is provided to allow objects to be located which are concealed under an examination surface to be located. Here, preferably, the locating data relating to the locating of objects to be located which are concealed under an examination surface are output to the user of the device during a locating process, or following thereafter, in the form of a prepared map which is able to be easily interpreted by the user. During a locating process, the locating device is preferably moved or displaced over a workpiece to be examined, in particular over the examination surface thereof, and hence repositioned.

An examination surface should be understood to mean, in particular, a surface of an article or workpiece to be examined in respect of concealed objects to be located. By way of example, and not exhaustively, the workpiece can be building materials, a wall, a floor, a ceiling, screed, an organic entity (in particular parts of the body as well) and/or parts of a terrain. By way of example, the article or the workpiece may consist of, in particular, wood, glass, plastic, cement, stone, brick, gypsum, metal, organic materials or the like. Moreover, in principle, it is also possible to examine liquids. Exemplary objects to be located are represented by inclusions of a material, which differs from the material of the article to be examined or the physical properties of which differ from those of the material of the article to be examined. Typical examples of such objects to be located are power lines, pipes, gas lines, cavities, reinforcements or the like, which are concealed in a building wall.

The imaging locating device, in particular a hand-held locating device, comprises at least a first locating apparatus, provided to detect locating data in relation to objects to be located which are concealed under an examination surface.

In principle, a locating apparatus, in particular the first locating apparatus, therefore serves to locate objects to be located which are concealed under an examination surface. Preferably, direct contact, in particular tactile contact, between a locating apparatus, in particular the first locating apparatus, and an object to be located is not required during the locating process.

A locating apparatus, in particular the first locating apparatus, should be understood to mean, in particular, an apparatus which has means which are provided to detect physical and/or chemical variables, which allow the presence of an object to be located to be deduced, and convert these variables into an electrically evaluable signal. Preferably, a locating apparatus, in particular the first locating apparatus, is provided to detect objects to be located which are concealed in an article to be examined by evaluating an electric and/or magnetic field change or a change in the time-of-flight of the radiation emitted into a material to be examined. In particular, a locating apparatus, in particular the first locating apparatus, includes components required for operating the means, electric circuits and the like. Preferably, the means of a locating apparatus, in particular of the first locating apparatus, have a locating sensor from a group of sensors which comprises at least an inductive sensor, an AC sensor, a capacitive sensor or the like. Locating sensors which are provided for detection by means of electromagnetic radiation are particularly suitable, such as e.g. a 50 Hz sensor, a microwave sensor, a radar sensor, a terahertz sensor, an ultrahigh frequency sensor, an x-ray sensor, an infrared sensor or an NMR sensor. Furthermore, acoustic sensors, e.g. ultrasound or impact-echo sensors, or neutron probes are also conceivable as locating sensors.

In particular, a locating sensor detects one or more raw values $S_{k,n}$ at a position $(x_n, y_n)$ in relation to the examination surface, where the index k denotes various sensor values of the locating sensor and the index n denotes the association of the raw value with the position. The position $(x_n, y_n)$ is detected by the position sensor. Here, the position data represent two-dimensional coordinates in a plane, in particular in the plane of the examination surface. However, it is also conceivable for these to be three-dimensional coordinates. The position data may be distributed uniformly over the examination surface in the form of a grid with equidistant spaces or distributed irregularly over the examination surface following any travel. The locating apparatus, in particular the means of the locating apparatus provided for operating the locating apparatus, calculate sensor values $S_{m,n}$ from the raw values $S_{k,n}$ of the locating sensor. In the simplest case, the calculation is carried out by identical mapping; in more complex cases by linear mappings such as forming a sum, forming a difference, weighting, or else by nonlinear mappings such as assignment of classes. These sensor values represent the locating values, specified within the scope of this patent, of a locating apparatus. The index m denotes locating data of different categories, as will be explained in still more detail below.

In particular, "provided" should be understood to mean, specifically, "programmed", "configured" and/or "equipped". An object being "provided" for a specific function should be understood to mean, in particular, that the object fulfills and/or carries out this specific function in at least one application and/or operating state, or it is configured to fulfill the function.

A hand-held locating device should be understood to mean, in particular, that the locating device can be transported without the aid of a transport machine and by using only hands, in particular one hand. In particular, the locating apparatus can be guided in a hand-held manner over the examination surface, even during a locating process with a movement freely carried out by a user of the locating instrument, in particular a movement carried out freely along two directions. Here, a free movement should be understood to mean, in particular, a movement which is independent of a predetermined grid or a predetermined track for the repositioning of the locating device, in particular for a movement or a travel of the locating device.

In particular, "repositioning" should be understood to mean a displacement, movement, shift, rotation, turn or different change in position and/or alignment of the locating device in relation to the examination surface, carried out in any direction.

A hand-held locating device according to the disclosure preferably has a housing which receives at least the essential functional components of the locating device. In particular, the housing receives at least one control apparatus, the first locating apparatus, a position sensor, an evaluation apparatus, an input and/or output apparatus, a display apparatus in particular, and also an energy supply apparatus. In particular, in terms of the overall volume thereof, more than 50%, preferably more than 75%, particularly preferably 100% of the components are housed in the housing of the locating device. Preferably, the hand-held locating device may have a handle or handle region, by means of which the locating device can be guided over the examination surface of the article to be examined. The mass of the hand-held locating device is less than 5 kg in particular, advantageously less than 3 kg and particularly advantageously less than 1 kg. In this way, it is possible to realize a particularly compact locating device in the form of a locating device that is easily guidable by a user in one hand. Furthermore, this allows the components of the locating device to be advantageously protected by the housing of the locating device against damage and ambient influences, for example against the ingress of moisture and dust.

The locating device, preferably the hand-held locating device, has a position sensor for detecting the position data of the locating device in relation to the examination surface. A position sensor should be understood to mean, in particular, an apparatus provided to convert a field change, a time-of-flight change and/or a phase shift into an electrically evaluable signal and to output or transmit a current position of the position sensor, and hence of the locating device, in relation to the examination surface. Here, the current position can be detected relative to an earlier position or in absolute terms, in particular in relation to at least one stationary reference point, and output or transmitted as position data. A reference point should be understood to mean a point which is fixedly arranged relative to the examination surface, for example a point fixed by a marking element of the locating device or a prominent point at a transition from the examination surface to another surface, for example a building partial surface. By way of example, such a reference point may be defined at an edge formed by a floor and a wall. Furthermore, it is conceivable for the position sensor to be provided to determine a position by means of an external reference, for example stationary transmitters and/or satellites. Alternatively, it is furthermore conceivable for the position sensor to be provided to detect position data for a locating process in a purely relative manner, independently of a reference point on the examination surface.

The position sensor can be provided in various embodiments. In one embodiment, the position sensor may be embodied as e.g. an optical and/or mechanical displacement sensor which, in one operating state, detects a movement and/or rotation of the locating device on the examination surface. In particular, the optical and/or mechanical displacement transducer is arranged in the housing side of the locating device facing the examination surface when the locating device is in use. By using an optical displacement transducer, it is advantageously possible to minimize the distance between locating device and examination surface, with, at the same time, the locating depth of the locating device being increased. Here, the locating depth refers to that distance into the examination article up to which an object to be located can still be detected by the locating device.

Alternatively, or additionally, the position sensor may e.g. be embodied as a distance-sensitive sensor and be provided for a distance measurement to at least one reference point by means of electromagnetic radiation, e.g. a laser light, infrared waves or radar waves.

Alternatively, or additionally, the position sensor may also comprise a camera. In this way, it is possible to provide an easily configurable, particularly precise, in particular absolute position determination. In this context, a camera should be understood to mean an apparatus provided for the continuous detection of image data. The camera may be embodied as an optical camera, an infrared camera or as a camera for a different wavelength range. Preferably, the camera is arranged stationary relative to the examination surface, for example on a tripod, and provided to detect the position of the locating device on the examination surface. It is conceivable for the camera to have a single optical unit or a plurality of optical units and, for example, to be embodied as a stereo camera. In this embodiment, the locating device preferably has at least one marker which is fixed in space relative to the locating apparatus, preferably relative to the locating sensor thereof. The marker is provided to be detected by the position sensor, in particular by the camera. In this context, a marker should be understood to mean, in particular, a region which has a surface that differs from the surroundings of the region for the purposes of detection by the position sensor. Preferably, the marker is provided for detection by the camera. Preferably, to this end, the surface of the marker has a color, structure and/or reflection properties in accordance with the wavelength range, in which the camera is sensitive, which differs from the surroundings of the marker. Particularly preferably, the locating device has a plurality of markers, which are each provided to supply position data if some of the markers are covered, at least from time to time, for the position sensor, in particular the camera, during the locating process.

Alternatively, or additionally, provision can be made of a separate sensor, and/or a sensor integrated into the position sensor, for detecting the current alignment of the locating device, in particular in relation to the examination surface. By way of example, to this end, provision may be made of an inertial sensor system, by means of which a rotation of the locating device in any direction can be detected and evaluated quantitatively.

Alternatively, or additionally, the position sensor may also be based on other measurement methods appearing expedient to a person skilled in the art, for example configured as an ultrasound sensor, a barometric sensor or a GPS sensor. In particular, the position sensor can comprise one or more sensors of a group of sensors which comprises at least sensors sensitive to inclination, angle, distance, translation, acceleration and rotation rate.

The position data established and output by the position sensor relate at least to coordinates in two directions, which determine the position of the position sensor, and hence of the locating device, on the examination surface. Preferably, the position sensor is moreover provided to also determine the alignment of the position sensor, and hence of the locating device, in relation to the examination surface. In this case, the position data also comprise data which describes the alignment of the locating device in relation to the examination surface.

The locating device furthermore comprises a control apparatus for actuating the functional components of the locating device, in particular for actuating at least the first locating apparatus, the position sensor, an evaluation apparatus, preferably also an input apparatus and/or an output apparatus, a data communication interface, a memory apparatus and further components appearing expedient to a person skilled in the art. In particular, the control apparatus should be understood to mean an apparatus comprising at least one control electronics unit, which has means for communicating with the other components of the handheld locating device, for example means for open-loop and/or closed-loop control of at least one locating apparatus and/or means for data processing and/or further means appearing expedient to a person skilled in the art. In particular, the control apparatus is provided to set at least one operating function parameter of the locating device in a manner dependent on at least one user input and/or an evaluation result from the evaluation apparatus. Advantageously, the control electronics unit of the control apparatus can be understood to mean a processor unit in conjunction with a memory unit and with an operating program stored in the memory unit, said operating program being run during the control process. In particular, the electronic components of the control apparatus may be arranged on a circuit board or printed circuit board, preferably in the form of a microcontroller. Particularly advantageously, the control apparatus may moreover be provided to control the whole locating device and facilitate the operation thereof. In particular, the control apparatus is provided to communicate with the other functional components of the locating device, in particular at least one locating apparatus, the evaluation apparatus, the position sensor, an input apparatus and/or an output apparatus, a memory apparatus and a data communication interface and/or further components appearing expedient to a person skilled in the art.

An energy supply apparatus of the locating device is provided to supply the locating device with electrical energy, both for startup and during the operation. Preferably, this apparatus is a mains-independent energy storage, in particular an accumulator, a battery, a fuel cell, a capacitor, another energy store appearing expedient to a person skilled in the art or a combination/plurality thereof. Preferably, accumulators with a cell chemistry providing a high power and/or energy density are particularly suitable for supplying the locating device with energy. Currently, these include e.g. accumulators with lithium and lithium ion cell chemistry, in particular lithium iron phosphate accumulators, lithium manganese oxide accumulators, lithium nickel cobalt manganese oxide accumulators, over-lithiated lithium nickel cobalt manganese oxide accumulators, lithium sulfur accumulators, lithium polymer accumulators and lithium oxygen accumulators. Preferably, the apparatus for energy supply has a detachable interlocking and/or force-fit connection interface. In this context, detachable should be understood to mean, in particular, separable in a non-destructive manner. Hence, the apparatus for energy supply is arrangeable on the locating device, preferably in a removable and interchangeable manner. Particularly preferably, the removable apparatus for energy supply can be resupplied and charged with energy from main power when within and/or outside of the locating device. In an alternative, or additional, embodiment, the locating device, for the energy supply thereof, may also have a power cable.

In an advantageous embodiment of the locating device according to the disclosure, the locating device has an input apparatus for inputting work parameters and/or an output apparatus for outputting work parameters. Here, work parameters denote all necessary and/or expedient operational parameters of the locating device, in particular in relation to the control thereof, and parameters relating to the evaluation of the measurement results.

In particular, an input apparatus should be understood to mean a means provided to accept at least one information item from a user of the locating device and to forward this to the control apparatus and/or the evaluation apparatus. By way of example, the input apparatus can be realized in the form of a user interface and/or using another device. Here, the user input may, in particular, be carried out by way of an acoustic, optical, gesture-assisted and/or tactile input. By way of example, the input apparatus may consist of an actuating element, a keyboard, a display, in particular a touchscreen display, a speech input module, a gesture identification unit and/or a pointer device (e.g. a mouse). Furthermore, the input apparatus may additionally be present also outside of the locating device, in particular outside of the locating device, for example in the form of an external data device such as a smartphone, a tablet PC, a PC or any other external data device appearing expedient to a person skilled in the art which is connected to the control apparatus and/or the evaluation apparatus of the locating device by way of a data communication interface. The latter is advantageous, in particular, if the external data device permits and/or assists an extended functionality of the locating device, for example a specifically prepared input possibility or the like.

An output apparatus should be understood to mean at least one means provided to output at least one changing information item in an acoustic, optical and/or tactile manner to a user of the locating device, in particular the locating device. By way of example, this can be realized by means of a display, a touch display, a sound signal, a change in an operational parameter, a vibration transducer and/or an LED display. In a particularly preferred embodiment, the output apparatus can be realized as a display apparatus. Furthermore, information to be output, e.g. evaluation results and/or information relating to an operating state of the locating device, may also be output to a functional component of the locating device, in particular to the control apparatus, to a memory apparatus, to at least one locating apparatus, to the position sensor, to the evaluation apparatus and/or, particularly for increasing the user comfort, to a data processing system. The latter comprises at least also an output of an information item to an external device such as a smartphone, a tablet PC, a PC or any other external data device appearing expedient to a person skilled in the art, which is connected to the evaluation apparatus and/or the control apparatus of the locating device by way of a data communication interface.

Both the input apparatus and the output apparatus may advantageously be housed directly in the housing of the locating device. Preferably, the input apparatus and/or the output apparatus is then arranged in a housing side facing the user of the locating device when the latter is used. In particular, a housing side means an outer wall of the housing delimiting the locating device from the surroundings thereof. Here, "arranged in a housing side" should be understood to mean that the input apparatus and/or the output apparatus is/are inserted, applied or fastened in any other way on the housing side in the surface thereof. In particular, the housing itself may also be part of the input or output apparatus. Alternatively, or additionally, the input and/or output apparatus may also be outsourced and, for example, realized by way of external apparatuses. The latter realization options explicitly comprise the control, evaluation and output of locating results by way of wired and/or wireless external systems such as e.g. remote controls, computer controls, tablet PCs and/or other mobile devices such as cellular telephones, smartphones etc.

In an advantageous embodiment of the locating device according to the disclosure, provision is made of at least one memory apparatus for storing measurement results, in particular locating results, and/or locating data and/or position data and/or at least two-dimensional map information items and/or work parameters. In particular, a memory apparatus should be understood to mean an electronic data memory comprising the means required for the actuation thereof. The memory apparatus is provided for storing and recalling measurement results and/or locating information and/or work parameters and/or other data required or expedient within the scope of operating the locating device. In particular, the memory apparatus is provided to store, at least temporarily, and/or recall locating data and/or evaluated locating information, preferably at least two-dimensional map information items. However, in principle it is also conceivable for the memory apparatus to be provided for storing and recalling data components.

Preferably, the memory apparatus is embodied as a memory which is writable and readable by the evaluation apparatus and/or the control apparatus. The memory apparatus may comprise all forms of external and internal electronic memories, in particular digital memories, for example a RAM component or integrated circuits. Alternatively, or additionally, the memory apparatus may, in particular, also be provided for writing and reading changeable storage media such as memory chips, USB sticks, memory sticks, memory cards, SD cards or the like. In a preferred configuration, the memory apparatus may be integrated into the evaluation apparatus and/or into the control apparatus and/or into the input apparatus and/or into the output apparatus and/or into a data communication interface, i.e., for example, embodied as part of a memory of the evaluation apparatus.

In an advantageous embodiment of the locating device according to the disclosure, provision is made of a data communication interface for, in particular, wireless communication, by means of which the locating device can interchange data, in particular transmit and/or receive measurement results, in particular locating results and/or locating data and/or position data and/or at least two-dimensional map information items and/or work parameters. In terms of signaling, the data communication interface is connected to at least the control apparatus and/or the evaluation apparatus of the locating device. Preferably, the data communication interface uses a standardized communication protocol for transmitting electronic, in particular digital data. Advantageously, the data communication interface comprises a wireless interface, in particular e.g. a WLAN, Bluetooth, infrared, NFC, RFID interface or any other wireless interface appearing expedient to a person skilled in the art. Alternatively, or additionally, the data communication interface may also have an adapter for a wired data transfer, e.g. a USB or micro USB adapter.

Advantageously, measurement results, in particular locating results, and/or locating data and/or position data and/or at least two-dimensional map information items and/or work parameters may, by way of the data communication interface, be transmitted to, or received by, an external data device, for example to a smart phone, a tablet PC, a PC, a printer or further external devices appearing expedient to a person skilled in the art. By means of the configuration according to the disclosure, it is advantageously possible to facilitate a transfer of data which is usable for further evaluation of measurement signals and/or at least two-dimensional map information items detected by the locating device. Furthermore, multifaceted additional functions may advantageously be facilitated and included, which additional functions, in particular, also require direct communication with smartphones (in particular by way of programmed apps) or similar portable data devices. By way of example, these may comprise automatic evaluation functions, firmware updates, data postprocessing, data preparation, data reconciliation with other devices, or the like.

Locating data should be understood to mean, in particular, measurement values and/or measurement signals of a locating apparatus, in particular of the at least one first locating apparatus. The locating data may comprise measurement values and/or measurement signals from different categories, depending on the configuration of the employed locating apparatus and, in particular, also depending on a manner of use and/or application of an employed locating device. Within the scope of this patent, "locating data of a category" denotes, in particular, measurement values and/or measurement signals of a locating apparatus, the measurement of which is for a physical variable, in particular also chemical variable, of interest. Here, the variable may relate to and/or be a property of the examined material, in particular of the object to be located and/or of the workpiece, and/or a property of a process, e.g. of radiation, and/or a property of a state, for example an electric or magnetic field. The variable may be either dimensionless or dimensional. Preferably, the locating data are subject to a categorization in respect of an information item contained in the corresponding locating data, in particular an item of information relating to the location of objects to be located which are concealed under an examination surface. Preferably, the locating data of one category may, in addition to analog or digital measurement values and/or measurement signals, also relate to Boolean statements and/or criteria and/or indicators or the like. Reference is once again made to the fact that a distinction of locating data in various categories depends, in particular, on an employed locating apparatus and also on the manner in which the latter is used and/or applied.

In particular, the manner in which a locating apparatus is used and/or applied should be understood to mean that different measurement values and/or measurement signals are established and/or generated and/or output as a consequence of a different information input, in particular an actuation, different signal processing, in particular carrying out a measurement, and/or a different information output of the locating apparatus. Preferably, the manner in which the locating apparatus is used and/or applied brings about an effect on the functionality of the locating apparatus, in particular on the functionality of a comprised locating sensor.

Examples of locating data of one category may be, in particular, locating data which relate to physical variables, in particular also chemical variables, such as, in particular, an amplitude or a phase shift or directional information or a signal strength or relaxation time or depth information or a true/false statement about the presence of an object to be located or the like. By way of example, if a locating apparatus comprising a radar sensor is considered, e.g. at least the following locating data of different categories, in particular, are conceivable:

measurement values and/or measurement signals relating to the time-of-flight of radar pulses, measurement values and/or measurement signals relating to reflection coefficients, measurement values and/or measurement signals relating to phase differences, measurement values and/or measurement signals relating to a detection direction (directional effect, electric alignment of the electromagnetic radiation), measurement values and/or measurement signals relating to polarization directions.

In this context, an item of depth information should, in particular, be understood to mean an information item which reproduces a distance of the object to be located from the examination surface and/or an extent of the object to be located perpendicular to the examination surface.

The locating device has an evaluation apparatus which has an information input, an information processing unit and an information output. The information input preferably serves to receive locating data determined by means of a locating apparatus, in particular the first locating apparatus, and/or position data established by means of the position sensor. The information processing unit serves to process, in particular evaluate, received data. The information output serves to forward the processed and/or evaluated data to the control apparatus and/or a memory apparatus and/or a data communication interface and/or an output apparatus and/or a display apparatus of the locating device. Advantageously, the evaluation apparatus has components which comprise at least one processor, a memory and an operating program with evaluation and calculation routines. In particular, the electronic components of the evaluation apparatus may be arranged on a circuit board, preferably on a common circuit board with the control apparatus. Particularly preferably, the electronic parts of the evaluation apparatus are realized in the form of a microcontroller. Furthermore, the control apparatus and the evaluation apparatus may also, particularly preferably, be configured as a single part. Furthermore, the evaluation apparatus may also be configured as a single part with components of the display apparatus.

The evaluation apparatus is provided to determine and/or provide a first at least two-dimensional map information item by assigning locating data of at least one locating apparatus, in particular locating data of the first locating apparatus, preferably locating data of a first category from the first locating apparatus to position data. Advantageously, the evaluation apparatus is thus provided to assign the locating data provided by means of a locating apparatus, in particular the first locating apparatus, in particular e.g. established amplitude values, depth information, signal phases or the like, to position data established by means of the position sensor. In principle, a converse assignment may also be carried out. The evaluation apparatus in this way permits the determination and/or provision of a first at least two-dimensional map information item, in which both position data and locating data, established by means of the first locating apparatus, of a first category are correlated in a structurally particularly simple manner.

It should be noted that, in principle, the evaluation apparatus may also be subdivided into a plurality of subordinate evaluation units, with an evaluation unit being provided for evaluating locating data of a specific locating apparatus, in particular a locating apparatus comprising a specific locating sensor, and/or locating data of a specific category.

In particular, determining and/or providing an at least two-dimensional map information item, in particular a first at least two-dimensional map information item, should be understood to mean that at least one map information item relating to an existence or a position or a depth or a material or an alignment or any other property appearing expedient to a person skilled in the art of an object to be located which is concealed under an examination surface is determined by the evaluation apparatus from locating data detected by a locating apparatus, in particular the first locating apparatus, and/or made available to the locating device for further processing. Preferably, an at least two-dimensional map information item, in particular the first at least two-dimensional map information item, is made available to a display apparatus and/or a data communication interface and/or a memory apparatus for the purposes of further processing by the evaluation apparatus. In particular, within the scope of this patent, an at least two-dimensional map information item should be understood to mean data, in particular, which are provided to be output, at least in part, in the form of a map to a user of the locating device by means of a display apparatus. In a preferred embodiment of the locating device, the output can be effected in the form of a map by way of e.g. a planar, two-dimensional output display of the display apparatus. Preferably, a map information item, in particular the first at least two-dimensional map information item as well, represents an information item about a location of the objects to be located which are concealed under an examination surface, which information item is evaluated multi-dimensionally, in particular pseudo-multidimensionally, but at least two-dimensionally. Here, the characterization "at least two-dimensional" denotes the fact that a map information item contains an information item about objects to be located which are concealed under an examination surface in at least two directions, preferably in two orthogonal directions. Here, the two directions of the examination surface are assignable, for example on the basis of given and/or definable reference points. Preferably, the two directions extend in a plane of the examination surface, in particular along the examination surface and/or in a plane arranged parallel to the examination surface. Preferably, an at least two-dimensional map information item, in particular the first at least two-dimensional map information item, at least comprises information about objects to be located which are concealed under an examination surface, which objects to be located are correlated with two-dimensional position data of the locating device in relation to the examination surface at the locating time of the location. An at least two-dimensional map information item, in particular the first at least two-dimensional map information item, may, in particular, relate to information or measurement values from a locating apparatus obtained immediately by a measurement, for example amplitudes, phase shifts, relaxation times or the like. Alternatively, an at least two-dimensional map information item, in particular the first at least two-dimensional map information item, may also relate to interpreted and/or prepared information, such as directional information, qualitative signal strengths of a locating signal, depth information or the like.

The locating device constitutes an imaging locating device within the meaning of determining an at least two-dimensional map information item, in particular the first at least two-dimensional map information item, which can preferably be output to a user of the locating device in the form of a map or an image of the examination surface. Therefore, "imaging" characterizes, in particular, the capability of the locating device to provide a graphic illustration of the locating results, in particular of an at least two-dimensional map information item, as a consequence of a locating process and, preferably, output this to a user of the locating device.

In a preferred embodiment, an at least two-dimensional map information item, in particular the first at least two-dimensional map information item, may be processed and/or stored and/or output in the form of an, in particular, multi-dimensional matrix, table, array, list or the like. In this multidimensional matrix, table, array, list or the like, for example, position data in respect of respectively one of two orthogonal spatial directions may be assigned in a column in each case. A third column serves for the assignment of locating data and/or already evaluated information, established at an appropriate position, such as e.g. information about the presence of an object to be located or information about the depth, at which an object to be located is detected. For further use, there can preferably be an output of an at least two-dimensional map information item to the control apparatus and/or the display apparatus and/or the data communication interface. The display apparatus, in particular, is provided to process an at least two-dimensional map information item, in particular the first at least two-dimensional map information item, provided in the form of an, in particular, multidimensional matrix, table, array, list or the like and preferably display this as a map on a display unit, for example a display. Here, the display apparatus is preferably provided to display an at least two-dimensional map information item, in particular the first at least two-dimensional map information item, in the form of a color-coded or grayscale-coded map.

Advantageously, a successive examination and measurement of the examination surface may be carried out by repositioning, in particular displacing, the locating apparatus in relation to the examination surface. Here, the first at least two-dimensional map information item is successively extended with locating data and position data of the locating apparatus, assigned to one another, in particular in relation to the examination surface.

In an alternative, or additional, embodiment of the locating device, provision can be made for an at least two-dimensional map information item, in particular the first at least two-dimensional map information item, to be generated using a directionally and/or spatially resolving locating apparatus. In this embodiment, the directionally and/or spatially resolving locating apparatus is provided to detect, in a directionally and/or spatially resolved manner, an information item about an object to be located, at least in part, in two dimensions or directions, along which the examination surface extends. The directional and/or spatial resolution is preferably effected in relation to the examination surface, in particular on the basis of given and/or definable references in respect of the locating device as a reference. A correlation of the direction or the spot of the location with reference to the locating device may, for example, be realized using angles and/or coordinates which, in each case, define relative angles or coordinates in relation to a feature of the locating device, in particular, for example, the center point of the locating sensor of the directionally and/or spatially resolving locating apparatus. Hence, what can advantageously be achieved is that locating data can be correlated with a directional and/or spatial information item, in particular in respect of the position and/or alignment of the directionally and/or spatially resolving locating apparatus on the examination surface. In this manner, it is possible, for example, to link a location of a concealed object to be located with a directional specification under which the corresponding locating data are detected, as seen from the directionally and/or spatially resolving locating apparatus and hence from the locating device. Hence, a directional and/or spatial resolution is effected using only the locating apparatus itself, and so repositioning of the locating device in relation to the examination surface is not required for generating a directional and/or spatial resolution.

Preferably, the angles and/or coordinates when using the directionally and/or spatially resolving locating apparatus may alternatively, or additionally, be used as position data for determining an at least two-dimensional map information item, in particular the first at least two-dimensional map information item.

For the purposes of realizing a directionally and/or spatially resolving locating apparatus, the locating apparatus may be provided to detect a physical and/or chemical variable, which is suitable for examining an object to be located which is concealed under an examination surface in a directionally and/or spatially dependent manner, and convert said variable into an electrically evaluable signal. In one embodiment, the locating apparatus, in particular the first locating apparatus, may e.g. comprise for this purpose a directionally and/or spatially resolving locating sensor from a group of sensors which comprises at least sensors based on dielectric and/or resistive methods, in particular capacitance sensors, microwave sensors, ultrasonic sensors, resistance sensors, conductivity sensors and/or radar sensors, in particular also ultra-broadband radar sensors and/or broadband impulse radar sensors, but also sensors sensitive to induction, radiation and magnetic fields. Alternatively, or additionally, the at least one directionally and/or spatially resolving locating sensor of the directionally and/or spatially resolving locating apparatus may also be embodied as an electrically and/or mechanically pivotable locating sensor and/or as an electrically alignable locating sensor and/or as an array of locating sensors and/or as an imaging locating sensor.

Here, in particular, "electrically alignable" means an alignment (directing) of the locating sensor, in particular of a signal transmitted and/or detected by the locating sensor, by an electric actuation, as may be realized e.g. using locating sensors which emit and/or detect electromagnetic radiation. Reference is made to the fact that the electric alignment by electric actuation differs from electric, in particular motorized, pivoting of the locating sensor.

In the specified realization forms, directionally and/or spatially resolved locating data are preferably established dependent on a pivot angle and/or a pivot position and/or an alignment angle and/or an alignment position by the locating sensor and output to the evaluation apparatus. The pivot angle and/or the pivot position can preferably be converted into a position coordinate, and so a relationship to the examined examination surface is established. In particular, position data of the directionally and/or spatially resolving locating apparatus are therefore generable.

By using a directionally and/or spatially resolving locating apparatus, a user of the locating device can nevertheless determine an at least two-dimensional map information item with a directional and/or spatial resolution in a certain detection region using only one measurement and without repositioning of the locating device in relation to the examination surface. A statement as to whether, for example, drilling can be carried out at the selected (measurement) position on the examination surface without damaging examination articles concealed under the examination surface is derivable directly and with high reliability from the at least two-dimensional map information item, in particular the first at least two-dimensional map information item. Furthermore, objects to be located which are situated in the vicinity of the selected position may already be identified, and so a user can more easily estimate a risk or hazard.

According to the disclosure, it is proposed that the evaluation apparatus is provided to determine at least one further at least two-dimensional map information item which differs from the first at least two-dimensional map information item. Therefore, the evaluation apparatus renders it possible to determine at least one further at least two-dimensional map information item, for example a second or else a third at least two-dimensional map information item, and provide this to the locating device, in particular the display apparatus and/or the data communication interface and/or the memory apparatus, for further processing. Preferably, the at least one further at least two-dimensional map information item represents a multidimensional, in particular pseudo-multidimensional information item, which is, however, at least evaluated in two dimensions, about the location of the objects to be located which are concealed under an examination surface. Hence, the at least one further at least two-dimensional map information item may advantageously likewise relate to an existence or a position or a depth or a material or an alignment or any other property appearing expedient to a person skilled in the art of an object to be located which is concealed under an examination surface. Like the first at least two-dimensional map information item, the at least one further at least two-dimensional map information item may relate, in particular, to information or measurement values of a locating apparatus directly related to a measurement, for example amplitudes, phase shifts, relaxation times or the like. Alternatively, the at least one further at least two-dimensional map information item may also relate to interpreted and/or prepared information, such as directional information, qualitative signal strengths of a locating signal, depth information or the like.

According to the disclosure, the at least one further at least two-dimensional map information item differs from the first at least two-dimensional map information item in respect of the information content thereof. In this way, the special advantage is generated of also determining and providing a further information item contained in the at least one further at least two-dimensional map information item in addition to the information contained in the first at least two-dimensional map information item. Expressed differently, using the at least one further at least two-dimensional map information item, it is possible to obtain and provide further information about objects to be located which are concealed under an examination surface. This further information may relate or contain both redundant information and additional information which goes beyond the information contained in the first at least two-dimensional map information item.

In one exemplary embodiment, information about metallic objects to be located which are concealed under an examination surface may be contained in particular in the first at least two-dimensional map information item while e.g. information about current-conducting objects to be located which are concealed under an examination surface are contained in the at least one further at least two-dimensional map information item. The information content specified in this exemplary embodiment relates to different, in particular non-redundant, information items about objects to be located which are concealed under the examination surface.

Advantageously, the further information provided using the at least one further at least two-dimensional map information item may be used e.g. in the assessment, evaluation, interpretation, design, representation or the like of locating results, in particular of locating results contained in the first at least two-dimensional map information item. By determining and providing the first at least two-dimensional map information item and at least one further at least two-dimensional map information item, it is possible to increase and qualitatively improve the information content of the locating information determined by the locating device.

In one preferred embodiment of the imaging locating device, the evaluation apparatus is provided to determine at least one further at least two-dimensional map information item by assigning locating data of at least one further category to position data.

Advantageously, the locating data of at least one further category in this case represent locating data from the first locating apparatus. In this way, it is possible to establish locating data of at least one further category, in particular depending on the manner in which the employed locating apparatus is used and/or applied, said locating data being assigned to position data and therefore being used to determine the at least one further at least two-dimensional map information item.

In one embodiment of the imaging locating device, the locating data of the first category and the locating data of the at least one further category have different locating data from a list of locating data which contains at least real-valued locating data (e.g. amplitude, phase, signal strength, time duration, pulse duration, distance, frequency, temperature), complex-valued locating data (e.g. amplitude and phase, transmission coefficients, reflection coefficients), vector-valued locating data (e.g. frequency curves, time curves, spatial curves, angle curves of the aforementioned real-valued or complex-valued locating data) and matrix-valued locating data (e.g. a combination of the aforementioned vector-valued locating data such as e.g. spatially resolved frequency curves of reflection coefficients) or the like.

Advantageously, the at least one further at least two-dimensional map information item can thus be determined in a constructively simple manner using the first locating apparatus. Furthermore, the locating device can be realized in an economically expedient manner.

In a preferred embodiment of the imaging locating device, the evaluation apparatus is provided to determine at least one further at least two-dimensional map information item by assigning locating data from at least one further locating apparatus to position data.

Advantageously, the locating data are established using at least one further locating apparatus and provided to the device, in particular the evaluation apparatus. In this manner, it is possible to establish locating data, which preferably differ from the locating data established by the first locating apparatus, in a manner dependent on the selection of the at least one further locating apparatus. The evaluation apparatus processes these locating data of the at least one further locating apparatus, assigns them to position data and thus determines the at least one further at least two-dimensional map information item.

In an exemplary embodiment of the imaging locating device, the first locating apparatus and the at least one further locating apparatus, in particular a second locating apparatus, comprise sensors from a list of sensors which at least comprises inductive sensors (eddy current sensors, pulse induction sensors, transmit-receive sensors, magnetic field sensors), capacitive sensors, AC sensors, radar sensors, in particular ultra-broadband radar sensors and broadband impulse radar sensors, microwave sensors, ultrasound sensors, temperature sensors (contactless and non-contactless), impact-echo sensors, potential field sensors, resistance sensors, conductivity sensors, moisture sensors and NMR sensors or the like.

As one embodiment, a locating apparatus may alternatively, or additionally, have an imaging sensor, in particular an optical sensor, preferably a camera, which images the surface optically. In this context, a camera should be understood to mean an apparatus which is provided for continuous detection of image data. The camera may be embodied as an optical camera, as an infrared camera or as a camera for a different wavelength range. It is conceivable for the camera to have a single optical unit or a plurality of optical units and, in this manner, be embodied e.g. as a stereo camera. This locating apparatus designed thus detects image portions of the surface as locating data. It should be noted that such a locating apparatus only has limited suitability for locating objects to be located which are concealed under an examination surface. Furthermore, an optical sensor, in particular a camera, may be used for determining the position.

Advantageously, the at least one further at least two-dimensional map information item may thus be determined in a constructively simple manner using at least one further locating apparatus. Furthermore, the locating device can be realized in an economically expedient manner.

In a preferred embodiment of the imaging locating device, the evaluation apparatus is provided to determine at least one further at least two-dimensional map information item by assigning evaluated locating data from the first locating apparatus and/or at least one further locating apparatus to position data.

In particular, "evaluated locating data" should be understood to mean measurement signals and/or measurement data prepared and/or analyzed by means of the evaluation apparatus using evaluation routines. The evaluation apparatus or the locating apparatus itself comprises means required for carrying out such an evaluation, in particular e.g. closed-loop control routines, open-loop control routines, analysis routines, calculation routines, assignment routines, conversion routines, statistical evaluation routines, interpolation algorithms, extrapolation algorithms, filters or the like. Further means required for evaluating measurement data and/or measurement signals, in particular, common well-known means for evaluating measurement data and/or measurement signals, are sufficiently well known to a person skilled in the art and therefore not mentioned in any more detail here.

The measurement data and/or measurement signals provided by a locating apparatus may advantageously be examined in respect of information of interest in a targeted manner by way of the evaluation. Preferably, interpreted and/or prepared locating data, in particular information, e.g. directional information, yes/no information, depth information, material information or the like, in respect of locating objects which are concealed under the examination surface are subsequently available. The at least one further at least two-dimensional map information item is determined from these evaluated locating data by means of an assignment to position data. Consequently, the at least one further at least two-dimensional map information item has particularly intuitively understandable information in relation to objects to be located which are concealed under the examination surface. In this way, it is possible to realize a locating device, the established at least one further at least two-dimensional map information item of which is interpretable and understandable in a particularly intuitive manner. In particular, a user of the locating device may be assisted particularly well with the interpretation of the first at least two-dimensional map information item using the at least one further at least two-dimensional map information item, and so little training or learning outlay is required to use the locating device.

In an advantageous embodiment of the locating device according to the disclosure, in particular a hand-held locating device, the evaluation apparatus has a data improvement module. The data improvement module may be provided for compensating value variations by means of statistical methods and/or for improving a contrast. To this end, this data improvement module may have a multiplicity of calculation routines, said calculation routines, in particular, comprising statistical functions, for example for calculating statistical moments. Preferably, the data improvement module may be used to carry out statistical evaluations, such as e.g. weightings, mean value calculations of data or the like, when complementing and/or refining and/or updating locating information and hence ensure improved evaluation of locating data. In particular, further locating data may be established from the locating data by interpolation and/or extrapolation, said further locating data corresponding to the measurement positions which have not yet been measured by means of the locating device. Here, interpolation should be understood to mean all types of known interpolation algorithms. Examples of such interpolation algorithms represent linear and/or higher-order, in particular nonlinear interpolation algorithms, in particular interpolation algorithms on the basis of a Delaunay triangulation, on the basis of Kriging or inverse-distance weighting, and interpolation algorithms on the basis of a Voronoi interpolation (nearest neighbor interpolation). Furthermore, as a matter of principle, use can also be made of radar and/or ultrasound imaging methods, such as a "synthetic aperture focusing technique" (SAR, SAFT).

In particular, in this manner, it is possible, for example, for one of the further at least two-dimensional map information items also to contain a position-dependent information item as to whether measured locating data and/or calculated locating data and/or a plurality of locating data or the like are available for a position. In this way, this further at least two-dimensional map information item may be used to mark the regions for which locating data are already available.

In a preferred embodiment of the imaging locating device, the evaluation apparatus is provided to evaluate locating data from the first locating apparatus and/or at least one further locating apparatus and/or the first at least two-dimensional map information item and/or the at least one further at least two-dimensional map information item by applying image processing algorithms and/or electronic filters and/or digital filters, in particular spectral filters.

Image processing algorithms and/or electronic filters, in particular spectral filters, represent preferred embodiments of the evaluation routines of the evaluation apparatus. Here, image processing algorithms should be understood to mean routines and functions which are known from computer-assisted processing of digital images, documents or the like. By way of example, there, such routines relate to typical aspects of images, inter alia e.g. exposure, sharpness and unsharpness, contrast, image noise or the like. Such evaluation routines may advantageously also be applied to locating data, in particular at least two-dimensional map information items, and preferably be used for increasing the quality and/or density of an obtained information item.

In one example embodiment, the image processing algorithms comprise, in particular, routines for determining linked structures, in particular, edges. Such routines are known and may operate, for example, according to edge detection algorithm according to the Sobel algorithm and/or Canny algorithm and/or using an edge detection filter according to Prewitt and/or Roberts and/or Laplace.

In particular, electronic filters should be understood to be circuits known from electrical engineering and/or telecommunications, which are able to modify an electric signal, in particular a measurement signal and/or measurement data, in terms of amplitude and phase shift in a manner dependent on a frequency such that signal portions may be modified in a targeted manner, in particular attenuated and/or suppressed. By way of example, a high-pass filter, a band pass filter, a low pass filter or the like represents such an electronic filter. By applying such filters, the first and/or the at least one further at least two-dimensional map information item may be spectrally decomposed and filtered.

Reference is made to the fact that such electronic filters may, as a matter of principle, also be implemented in a computer-assisted manner, for example as an implementation based on software. In this case, the software-implemented filters likewise form image processing algorithms.

Thus, according to the disclosure, the locating data used to determine the first at least two-dimensional map information item and the at least one further at least two-dimensional map information item may be established and/or generated in different ways. In particular, locating data may be established and/or generated as immediate locating data of a locating apparatus—and thus also includes different categories of a locating apparatus as locating data as a consequence of a different application or use of the locating apparatus. Moreover, locating data may, alternatively or additionally, also be established and/or generated as evaluated locating data. In this way, an advantageously broad selection of usable locating data is available, said locating data providing and/or containing different information items about objects to be located which are concealed under an examination surface.

Some exemplary embodiments of locating data for various locating apparatuses are once again presented below.

By using a locating apparatus comprising an inductive sensor, in particular an inductive sensor with a harmonic excitation field, it is possible to detect and evaluate an amplitude and a phase of the reception voltage in a manner dependent on an excitation frequency as locating data of different categories of the locating apparatus. Both measurement signals, in particular both items of locating data of different categories, depend directly on a conductivity and a magnetic permeability of objects to be located which are concealed under the examination surface and allow conclusions to be drawn about the material properties. Preferably, it is possible to distinguish between ferromagnetic objects to be located, for example made out of iron, and non-ferromagnetic objects to be located, for example made out of copper, by using the aforementioned locating data of different categories.

By using a locating apparatus comprising a capacitive sensor, it is possible to determine e.g. a value of the capacitance or a change thereof (in general impedance) for an electrode, preferably for a plurality of different electrodes, as locating data of different categories of the locating apparatus. Furthermore, sums and/or differences of capacitance changes may be calculated when using a plurality of electrodes, in particular symmetrically arranged electrodes, which may be evaluated for establishing object properties, in particular wooden beams. By way of example, edges and/or centers of located objects to be located may be established from sums and differences of capacitance changes.

By using a locating apparatus comprising a 50/60 Hz sensor, it is possible to determine a value, or the change thereof, of a 50/60 Hz alternating signal induced on one electrode, preferably a plurality of values, or the changes thereof, of a 50/60 Hz alternating signal induced on a plurality of electrodes as locating data of different categories of the locating apparatus. By comparing the locating data of a plurality of electrodes, an information item about an absolute value of the electromagnetic 50/60 Hz alternating field may advantageously be evaluated from these locating data. Alternatively, or additionally, it is possible to evaluate an information item about a geometric position of the maximum of the electromagnetic 50/60 Hz alternating field relative to the electrodes and hence, for example, about the position of a current-conducting line. Alternatively, or additionally, it is possible to evaluate an information item about the alignment of the curve of the maximum of the electromagnetic 50/60 Hz alternating field and hence, e.g., about the orientation of a current-conducting line.

By using a locating apparatus comprising a radar sensor, it is possible e.g. to determine a time-of-flight of a radar pulse, a reflection coefficient, a phase difference, a reflection coefficient in different detection directions when using an antenna with electrical directability, a reflection coefficient of electromagnetic radiation emitted in different polarization directions or the like as locating data of different categories of the locating apparatus. From these locating data, it is possible to derive, in particular evaluate, many information items about the objects to be located which are concealed under an examination surface. By way of example, the depth of an object to be located may be evaluated from the time-of-flight. It is possible to draw conclusions about the type of the object to be located from a reflection coefficient at a point of reflection, in particular an object to be located. Like in the case of a capacitive sensor, centers and/or edges of objects to be located may be deduced from reflection coefficients in different detection directions. An orientation of extended objects to be located, e.g. of reinforced steel braces, metal pipes, plastic pipes or the like, may be evaluated from the reflection coefficient of electromagnetic radiation emitted with different polarization directions.

In a preferred embodiment of the imaging locating device, the evaluation apparatus is provided to determine the first at least two-dimensional map information item and the at least one further at least two-dimensional map information item in real time.

In particular, in this context, real time should be understood to mean that a processing speed of the evaluation apparatus corresponds to the repositioning speed, in particular displacement speed, of the locating device by the user, i.e. the user is able to assign the movement carried out by him with the locating device directly to a change in a map information item. The evaluation apparatus is provided to accept locating data and position data currently transferred in each case and exclude data received between two processing cycles from being processed. Preferably, the locating device leads the user to believe that the processing of locating data, in particular an evaluation of the locating data, preferably the determination of the first at least two-dimensional map information item and the at least one further at least two-dimensional map information item, is carried out at least substantially without delay. If the at least two-dimensional map information items are output to a user of the locating device by means of a display apparatus of the locating device, the locating device advantageously leads the user to believe that the display apparatus of the locating device reproduces the at least two-dimensional map information items at least substantially without delay. As a result, the user is able to identify objects to be located particularly quickly and reliably and it is possible to provide a particularly efficient locating device.

In an advantageous embodiment, a determination and provision of the at least two-dimensional map information items is only restricted by a device-internal processing rate, i.e., in particular, by signal transfer speeds and an evaluation speed. In particular, a processing rate of locating data and position data, which are accepted by the evaluation apparatus, is matched to a processing speed of the evaluation apparatus. Hence, data which cannot be processed immediately by the evaluation apparatus remain unconsidered. As a result of such a high processing rate, the user of the locating apparatus may be conveyed the impression that locating data for a region over which the locating device has passed are evaluated immediately and provided as at least two-dimensional map information items. In particular, the assumption of a determination and provision of the at least two-dimensional map information items in real time may be made if the device has an internal processing duration up to the completed determination of the at least two-dimensional map information items, in particular the display of the at least two-dimensional map information items by means of the display apparatus, which takes less than 2 seconds, preferably less than 1 second, particularly preferably less than 0.5 seconds.

In a preferred embodiment of the imaging locating device, the locating device has at least one display apparatus, which is provided to display the first at least two-dimensional map information item and/or the at least one further at least two-dimensional map information item as a map.

The display apparatus is provided to represent and display at least one portion of a two-dimensional map information item as a map. In this context, the display apparatus should, in particular, be understood to mean an apparatus which has a planar, two-dimensional display element provided for a pictorial display or output of at least two-dimensional map information items in the form of a map. To this end, the display apparatus is connected to the evaluation apparatus and/or the control apparatus of the locating device for the purposes of transferring at least two-dimensional map information items and/or maps. Here, the display apparatus may be connected to the evaluation apparatus and/or to the control apparatus by means of data cables or in a wireless manner. It is conceivable for the evaluation apparatus to be integrated into the display apparatus or for the display apparatus to be configured as a single component with components of the evaluation apparatus as well. The planar display element of the display apparatus may advantageously be realized as e.g. a liquid crystal display, an OLED display, an LED display, a screen provided for different suitable display technology, or as a projector. It is also conceivable for the display to be embodied with 3D capabilities and comprise a means provided to convey a three-dimensional image impression to a user. Preferably, the display apparatus is provided for displaying grayscale values, particularly preferably for displaying colors. Hence, an at least two-dimensional map information item may be output to a user of the locating device as a map using color or grayscale encoding. By displaying and outputting the locating information to a user of the locating device by means of the display apparatus, it is possible to provide a particularly compact, flexible and immediately usable locating device.

In a preferred embodiment, the display apparatus is provided to process at least two-dimensional map information items in the form of, in particular, multidimensional matrices, tables, arrays, lists or the like and to adapt and/or convert these for a display in the form of a map or at least a portion of a map. In particular, the display apparatus is provided to convert locating information into a display attribute for pictorial reproduction, such as e.g. into a grayscale level, a grayscale value of a grayscale curve, a color value level, a color value of a color curve, a brightness level, a brightness value of a brightness curve, a saturation level or a saturation value of a saturation curve and/or a pattern and/or a symbol.

In principle, it is also conceivable for the display apparatus to be embodied only separately from the locating device and be connected therewith via a wireless connection for the purposes of transferring output values, for example by way of a point-to-point connection, an ad-hoc connection, a WLAN connection, a Bluetooth connection or the like.

Furthermore, the display apparatus is provided, by way of a high processing rate and display rate, to lead a user of the locating device to believe that locating data for a region over which the locating sensor has passed are evaluated immediately, preferably in real time, and are displayed as locating and/or map information. In particular, a display in real time means that the device-internal processing duration by the display apparatus up to the completed display of the locating information on the display element is less than 2 seconds, preferably less than 1 second, particularly preferably less than 0.5 seconds.

Preferably, the display apparatus is provided to output a map as pictorial representation of an at least two-dimensional map information item, in particular of the first at least two-dimensional map information item and/or the at least one further at least two-dimensional map information item. In this context, a pictorial representation or display should be understood to mean, in particular, an optical reproduction of the locating data, preferably substantially true to scale and resolved in terms of position. Advantageously, the depicted map reproduces the examination surface in respect of the region of the examination surface examined by way of repositioning of the locating device. Preferably, the map pictorially reproduces at least the first at least two-dimensional map information item and/or the at least one further at least two-dimensional map information item.

In an exemplary embodiment, a displayed portion of a locating information item, in particular of an at least two-dimensional map information item, may have an imaging scale which corresponds to a ratio of extents of the map information in the display element to extents in an associated region of the examination surface. The imaging scale preferably has the same imaging scale for a first dimension and for a second dimension. The imaging scale is particularly preferably modifiable by a user of the locating device, and so an edge information item depicted in the display element may be magnified or reduced and therefore zoomed.

Alternatively, or additionally, other imaging scales are also conceivable. In particular, illustrations which are true to scale and not true to scale may both be used as output for a user of the locating device.

Preferably, the pictorial display is provided for interpretation by a human observer. In a preferred embodiment, the map is output as a two-dimensional image which represents an image of the locating conditions below the examination surface. It is preferably possible to directly gather from the map the positions of the examination surface at which, i.e., in particular, directions from the locating apparatus in which, objects to be located are detected. By way of example, in a preferred embodiment, a map output to a user may reproduce a true-to-scale 1:1 image of the locating conditions which are concealed under the locating apparatus. In this manner, a particularly simple transfer of positions of located objects to be located, which may be gathered from the map, to the workpiece is possible. Then, an object to be located displayed in the map is situated, as seen from the user, precisely at the corresponding position directly behind the locating apparatus, concealed under the examination surface. Alternatively, or additionally, other display scales are also conceivable. In particular, illustrations which are true to scale and not true to scale may both be used as output for a user of the locating device.

By using the map displayed by means of the display apparatus, the user of the locating device is able to generate and, at the same time, display an at least two-dimensional map information item, in particular the first at least two-dimensional map information item and/or the at least one further at least two-dimensional map information item, by successively passing over the examination surface with the locating device. Hence, the user of the locating device obtains a map which is interpretable in an intuitive manner, from which locating information in relation to the examination surface may be gathered. With a successive measurement of an examination surface as a consequence of a repositioning the locating device in relation to the examination surface, the user of the locating device obtains a clear, intuitive and easily interpretable, at least two-dimensional map.

It should be noted that, in addition to the output of a map, the display apparatus, in particular the display element, may likewise be provided to display all relevant, necessary and/or expedient work parameters for operating and controlling the locating device.

In a preferred embodiment of the imaging locating device, the at least one display apparatus is provided to display the first at least two-dimensional map information item and/or the at least one further at least two-dimensional map information item as a map having synthetic elements, in particular as a map having lines, filled polygons, shaded polygons, partly transparent polygons and/or symbols.

In principle, the depicted map may have synthetic data and/or elements such as, e.g., a grid, symbols, lines, coloration, shading or the like. By way of example, the display apparatus may be provided for displaying a locating direction, a locating accuracy, a symbolism simplifying an interpretation of the locating information, for displaying operating prompts or the like.

By way of example—depending on an information item to be displayed—evaluated locating data can preferably be depicted or represented by means of synthetic data and/or elements. Here, the synthetic data and/or elements represent, in particular, simplified and intuitively understandable interpretation aids and/or illustration aids, which, for a user of the locating device, simplify the interpretation and evaluation of the map, in particular the locating results, displayed by means of the display apparatus.

In a preferred embodiment, use can be made of e.g. geometric elements such as lines, squares, rectangles or the like to mark established edge profiles of located objects to be located and therefore to depict these particularly clearly. Hence, it is possible, in particular, to advantageously increase a contrast of the contour of the object to be located and, in particular, of the essential locating information of interest to the user.

In a preferred embodiment of the imaging locating device, the display apparatus is provided to overlay, in particular at least partly overlay, the first at least two-dimensional map information item and the at least one further at least two-dimensional map information item to form a common map.

Therefore, according to the disclosure, at least two-dimensional map information items may be overlaid by the display apparatus. In particular, the overlay of at least two-dimensional map information items should be understood to mean the overlay, superimposition, combination or the like of the maps generated by the respective at least two-dimensional map information items. In this way, it is possible to realize a combined locating information item in the form of a "common map", which at least takes account of, preferably contains, the corresponding locating information contained in the respective at least two-dimensional map information items. The common map is provided to be output to a user of the locating device by means of the display apparatus.

In an alternative or additional preferred embodiment of the imaging locating device, the evaluation apparatus is provided to combine, in particular at least partly combine, the first at least two-dimensional map information item and the at least one further at least two-dimensional map information item to form a common map information item.

According to the disclosure, the first at least two-dimensional map information item and the at least one further at least two-dimensional map information item may be combined to form a common map information item by means of the evaluation apparatus in a manner analogous to the overlay of at least two-dimensional map information items by means of the display apparatus. Preferably, combining the first at least two-dimensional map information item and the at least one further at least two-dimensional map information item to form a common map information item may be carried out in the form of preprocessing, preconditioning, combining, complementing, extending, making more precise, refining, accumulating, overlaying, weighting, postprocessing, fusing or the like. The "common map information item" takes account of, preferably contains, the locating information contained in the respective at least two-dimensional map information items such that an advantageously comprehensive map information item may be generated. The common map information item likewise constitutes an at least two-dimensional map information item, which is preferably provided for display in the form of a map by means of the display apparatus.

In this manner, information relating to the locating of objects to be located which are concealed under an examination surface, i.e., in particular, the first at least two-dimensional map information item and the at least one further at least two-dimensional map information item or the maps obtained from the respective map information items, may be combined and/or overlaid. In other words, this therefore renders it possible to combine and/or overlay information relating to the locating of objects to be located which are concealed under an examination surface, which information items, according to the disclosure, are established and/or generated in different ways. In particular, it is possible to combine and/or overlay information items which are established and/or generated as direct locating data of a locating apparatus and hence also included therewith as locating data of different categories of a locating apparatus as a consequence of different applications or uses of the locating apparatus—or which are established and/or generated as evaluated locating data. In this manner, it is possible to make available to a user of the locating device the advantageously broad selection of usable locating data, which respectively contain different, in particular redundant and non-redundant or complementary, information items about objects to be located which are concealed under an examination surface. The common map information items or the common map preferably have/has a high locating quality, a high information density and an intuitively understandable presentation, by means of which it is possible to assist a user particularly well in the interpretation of the information relating to the locating of objects to be located which are concealed under the examination surface. Advantageously, the user of the locating device is therefore protected from errors, in particular from an incorrect interpretation of the locating result, when using the imaging locating device. Furthermore, operation of the locating device is possible in an intuitive manner and with high operating comfort, and so little training or learning outlay is required for using the locating device. In particular, it is possible to provide a particularly efficiently and intuitively usable locating device since the locating device may detect comprehensive, preferably high resolution locating information within a short period of time. In particular, in addition to conventional locating results relating to the locating, the locating device also displays additional information together with the locating results. As a result, a particularly efficient locating process is realizable. Furthermore, different features of the object to be located can be detected and used for classification of the objects to be located.

In one exemplary embodiment, the user of the locating device therefore has available to him a locating device which renders it possible to obtain particularly comprehensive information in relation to the locating of objects to be located which are concealed under an examination surface from only one locating process. Thus, e.g. in addition to the statement as to whether it is possible to drill at a selected position on the examination surface without damaging objects to be located which are concealed under the examination surface, it is also possible, in particular, to make a statement about the quality and/or reliability of the locating data, a statement about a depth and/or a position and/or an alignment of objects to be located, a statement about the material of objects to be located, a statement about a conductivity and/or magnetic susceptibility of objects to be located and/or a statement about other properties appearing expedient to a person skilled in the art of objects to be located. Preferably, these information items are output by means of displaying, to the user of the locating device, a common map combining and/or overlaying the information items.

In an advantageous embodiment of the imaging locating device, the evaluation apparatus is provided to interpolate and/or extrapolate and/or weight and/or exclude locating data when combining the first at least two-dimensional map information item and the at least one further at least two-dimensional map information item to form a common map information item.

In this way, it is particularly quickly possible to provide a particularly comprehensive locating information item, in particular a common at least two-dimensional map information item. Incorrect measurements can be compensated and it is possible to achieve a high quality of the locating information. Weighting of locating data in particular may be used in an advantageous manner in order to obtain a high quality of the common map information items. In this context, weighting should be understood to mean, in particular, that information about one of the at least two-dimensional map information items is provided with a weighting factor when generating the common map information item. In particular, the weighting factor may also be zero. In this case, corresponding information remains unconsidered within the scope of the combination, for example data which are classified as having a measurement error or being irrelevant. In this way, it is possible to generate a particularly user-friendly, i.e., in particular, a particularly intuitively understandable, common map information item and/or map and output this to the user of the locating device.

In one advantageous embodiment of the imaging locating device, at least two-dimensional map information items which are to be combined and/or overlaid are selectable and/or adjustable. In particular, the at least two-dimensional map information items to be combined and/or overlaid may be selectable and/or adjustable, in particular also deselectable, manually by the user of the locating device. For this purpose, the user can for example select and/or adjust the at least two-dimensional map information items to be combined in a menu or by means of an operator element of an input apparatus of the locating device. In this manner, there can advantageously be a combination and/or superposition of at least two-dimensional map information items which are matched to an application and/or a measurement problem and/or a locating situation and/or locating information of interest. By way of example, a user may select between a combined representation of locating information relating to the existence and the material of objects to be located which are concealed under an examination surface and a combined representation of locating information relating to the existence and the locating depth of objects to be located which are concealed under an examination surface.

Alternatively, or additionally, the at least two-dimensional map information items to be combined and/or overlaid may be selectable and/or adjustable automatically by the locating device, in particular the evaluation apparatus and/or the control apparatus and/or the display apparatus. Hence, there can preferably be an ideal adaptation of the map to be displayed to an application and/or a measurement problem and/or measurement situation. In particular, it is possible to counteract an incorrect operation by an inexperienced user. Furthermore, the operation of the locating device is accelerated and intuitive operation of the locating device is promoted.

Depending on application, measurement problem, locating situation and/or locating information of interest, there may be, according to the disclosure, an adapted representation of the locating information in the form of a map output by means of the display apparatus. Advantageously, this allows a particularly flexibly usable locating device to be realized, which is also operable in a targeted manner.

In one advantageous embodiment of the imaging locating device, the display apparatus is provided to vary the displayed portion of the map in a manner dependent on position data from the locating device.

Preferably, the display apparatus displaces or magnifies the displayed portion of the map if the position data currently assigned to the locating device reach an edge region of the displayed portion of the map. Preferably, the edge region has a width of 5 percent, preferably 10 percent and particularly preferably 15 percent of an overall extent of the displayed portion.

In an advantageous embodiment of the imaging locating device, the display apparatus is provided to fix, in particular center, the displayed portion of the map in relation to the position of the locating device. Hence, the map is displaced and/or rotated when repositioning the locating device on the examination surface in such a way that the current position of the locating device—in relation to the displayed portion of the map—is always fixed, in particular centered. In this context, "fix" or "center" should be understood to mean, in particular, dynamic fixing or centering, i.e. the displayed portion of the map tracks the position of the locating device during a locating process. In other words, the position of the locating device in the map displayed for the user is always fixed at a predefined point, in particular centered in the middle. When repositioning the locating device on the examination surface, the displayed map is displaced so as to maintain this fixation, in particular centration. In this manner, it is possible to provide a particularly intuitively usable locating device, which advantageously assists an intuitive orientation of the user and is not susceptible to errors either. Therefore, the user of the locating device is always provided with an output of a portion of the map which is intuitively assignable to the actual position of the locating device in relation to the examination surface.

Preferably, the fixed, in particular centered position of the locating apparatus is marked in the map displayed for the user. By way of example, such a marking can be realized by a symbol in the form of crosshairs, a rectangle, a square or the like.

Particularly preferably, the corresponding position is reproduced by a true-to-scale representation and/or silhouette of the locating device and/or of the locating apparatus and/or of the locating sensor and/or of the active sensor region of the locating sensor. Furthermore, it is conceivable for the parameters of the display relating to the fixed and/or centered illustration to be designed to be adjustable and/or selectable by a user. In particular, this allows e.g. a pair of coordinates to be freely set, said pair of coordinates defining the position of the display element at which the position in relation to the marking is fixed and displayed on the displayed portion of the map.

In an alternative advantageous embodiment of the imaging locating device, the display apparatus is provided to track, in the displayed portion of the map, a current position of the locating device in accordance with the repositioning of the locating device in relation to the examination surface. Hence, a user of the locating device can correlate the current position of the locating device directly with the shown portion of the map since a marked position of the locating device on the displayed map is modified in a manner dependent on the repositioning of the locating device in relation to the examination surface. Preferably, the portion of the map displayed thereby is substantially maintained, unless the user, with the locating device, leaves the region of the examination surface reproduced in the displayed portion of the map.

Preferably, the user of the locating device is able to change between the two display options, for example by changing the system settings of the locating device.

In an alternative, or additional, embodiment of the imaging locating device, the display apparatus is provided to scale the displayed map in a manner dependent on the position data of the locating device. As a result, a locating device which is able to be used in a particularly flexible manner can be provided since objects to be located can be located particularly quickly and locating can be restricted to a particularly relevant region. In particular, in this context, scaling should be understood to mean that the display apparatus adapts an imaging scale and, in particular, increases and/or refines the resolution and makes smaller details visible. Alternatively, or additionally, the display apparatus may also adapt an imaging scale in such a way that the resolution is reduced and fewer small details are visible. An imaging scale should be understood to mean a ratio between extents of the displayed map and extents of an associated region of the examination surface. It is conceivable for the display apparatus to determine the imaging scale in a manner dependent on all detected position data or for the display apparatus to determine the imaging scale in a manner dependent on most recently detected position data and increase the imaging scale if the user moves the locating device in a restricted region of the examination surface. Here, "most recently" should be understood to mean within a determinable past time interval, for example within the respectively last 30 seconds or the like.

In an alternative, or additional, embodiment of the imaging locating device, the display apparatus is provided to scale the depicted portion of the map in a manner dependent on a displacement speed of the locating device and/or modify a resolution. As a result, it is possible to provide a locating device which is able to be used in a particularly flexible manner since objects to be located can be located particularly quickly and locating can be restricted to a particularly relevant region. Preferably, high displacement speed corresponds to a small imaging scale and the display apparatus shows a large region of the examination surface in the display element, while a low displacement speed corresponds to a large imaging scale and the display apparatus shows a small region of the examination unit with a correspondingly higher and/or more refined resolution.

In a preferred embodiment of the imaging locating device, the display apparatus is provided to modify, in particular displace, magnify, reduce, rotate or the like, the displayed portion of the map manually, i.e. depending on a user input. In this manner, the user of the locating device is provided with the option of obtaining a detailed overview of the located objects to be located, in particular after the locating has been carried out. By way of example, the user can look at the regions of the map of interest to him in detail, i.e. in a magnified manner. Changing the displayed portion of the map, in particular displacing, magnifying, reducing, rotating the displayed portion of the map or the like, may be realized using e.g. the input apparatus, the output apparatus or else using the position sensor as an input aid. In this manner, the user of the locating device can bring about a change in the displayed portion of the map, for example by displacing the locating device on the examination surface, which, in a manner analogous to carrying out the actual locating, allows him to evaluate already established map information off-line and therefore to evaluate the objects to be located which are concealed under the examination surface off-line.

In a preferred embodiment of the imaging locating device, the display apparatus is provided to depict a mark in the displayed portion of the map, said mark being assigned to a feature of the locating device and therefore representing the position of this feature in the displayed map. In particular, the feature may be the center of the locating sensor, the silhouette of the locating apparatus, in particular of the locating device, a defined marking apparatus, in particular an indication point, of the locating device or the like. In this manner, the position of the feature of the locating device can be related directly to the displayed portion of the map in a simple and unambiguous manner. By way of example, it is thus possible to relate a marking apparatus, in particular an indication point, of the locating device which is provided for labeling or marking a position of interest on the examination surface to the portion of the map displayed by the display apparatus. By way of example, if the mark representing the marking apparatus, in particular the indication point, is situated over an object to be located in the displayed map, the marking apparatus, in particular indication point, of the locating device is likewise, in relation to the examination surface, situated over the object to be located.

Here, in particular, an "indication point" should be understood to mean a recess provided in the locating device, said recess serving to indicate in a defined manner, e.g. by means of a pen, a label or position mark on the examination surface.

Furthermore, a method according to the disclosure for operating the imaging locating device is proposed, in which a first at least two-dimensional map information item is generated using an evaluation apparatus of the locating device by locating, by means of a first locating apparatus, objects to be located which are concealed under an examination surface, wherein at least one further at least two-dimensional map information item which differs from the first at least two-dimensional map information item is determined using the evaluation apparatus.

Furthermore, a method according to the invention for operating the imaging locating device is proposed, in which a first at least two-dimensional map information item is generated using an evaluation apparatus of the locating device by locating, by means of a first locating apparatus, objects to be located which are concealed under an examination surface, wherein at least one further at least two-dimensional map information item which differs from the first at least two-dimensional map information item is determined using the evaluation apparatus.

In a preferred embodiment of the method, the method can be characterized, in particular, by at least one of the following steps:
  placing the locating device onto an examination surface;
  repositioning the locating device in relation to the examination surface, in particular displacing or passing over the examination surface with the locating device;
  detecting locating data of a first locating apparatus in relation to objects to be located which are concealed under the examination surface;
  detecting position data of the locating device in relation to the examination surface by means of a position sensor;
  determining and providing a first at least two-dimensional map information item, preferably in real time, by assigning locating data of a first category from the first locating apparatus to position data by way of the evaluation apparatus;
  determining and providing at least one further at least two-dimensional map information item, preferably in real time, by assigning locating data of at least one further category of the first locating apparatus or locating data of at least one further locating apparatus or evaluated locating data to position data by way of the evaluation apparatus;
  combining the first at least two-dimensional map information item and the at least one further at least two-dimensional map information item to form a common at least two-dimensional map information item by means of the evaluation apparatus;
  displaying the first at least two-dimensional map information item and/or the at least one further at least two-dimensional map information item as a map, preferably in real time;
  overlaying the first at least two-dimensional map information item and the at least one further at least two-dimensional map information item to form a common map by means of the display apparatus.

BRIEF DESCRIPTION OF THE DRAWINGS

The disclosure is explained in more detail in the following description on the basis of exemplary embodiments depicted in the drawings. The drawing, the description and the claims contain numerous features in combination. Expediently, a person skilled in the art will also consider the features on their own and combine them to form expedient further combinations. The same reference signs in the figures denote the same elements.

In detail:

FIG. 6 shows a schematic illustration of different map displays (a-f) of the article to be examined from FIG. 5 which are generated when applying the locating device according to the disclosure.

DETAILED DESCRIPTION

Figure 1:
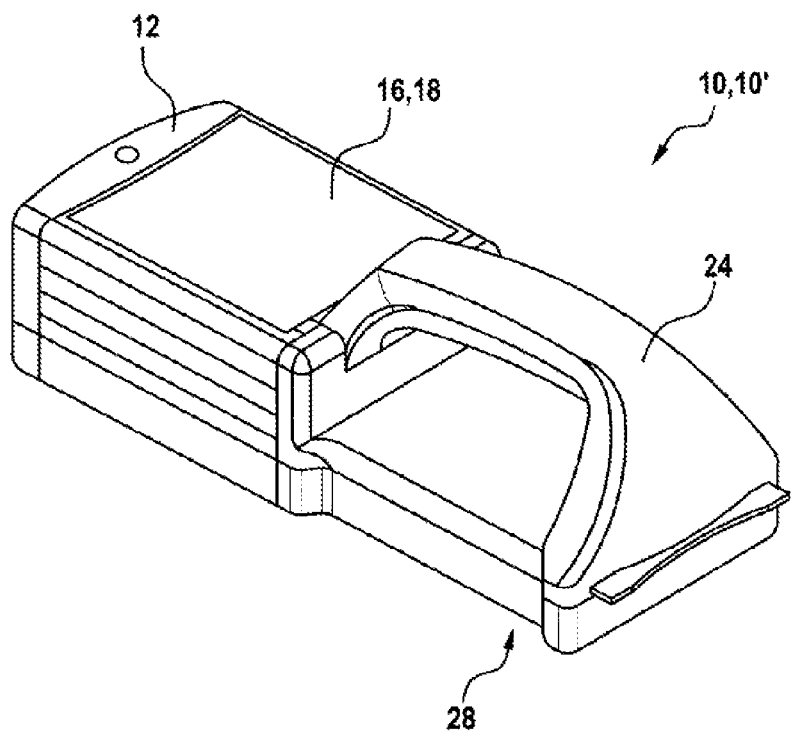
FIG. 1 shows a perspective side view of a configuration of a locating device according to the disclosure.
Figure 2:
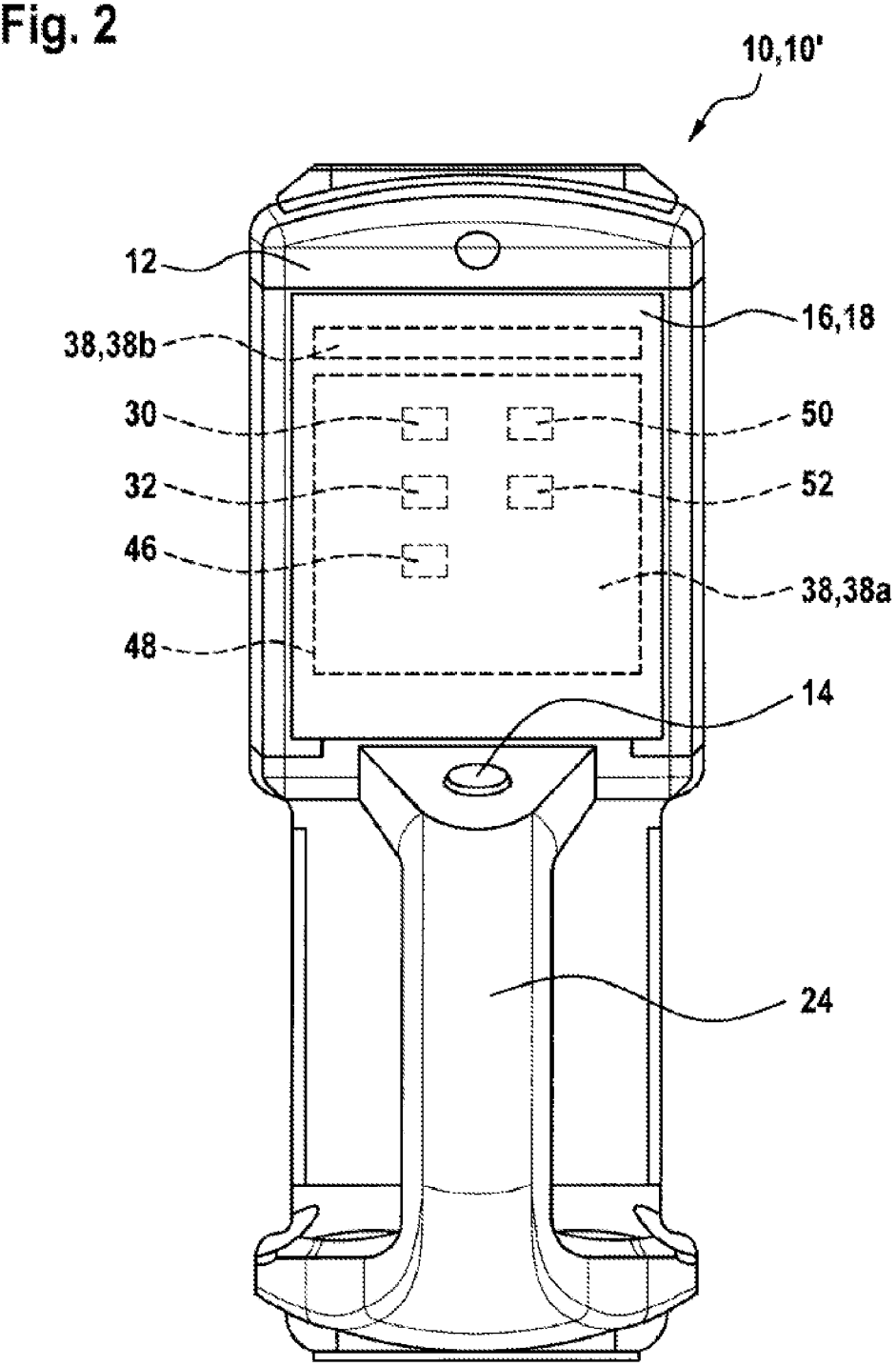
FIG. 2 shows a top view of the same configuration of the locating device according to the disclosure.
Figure 3:
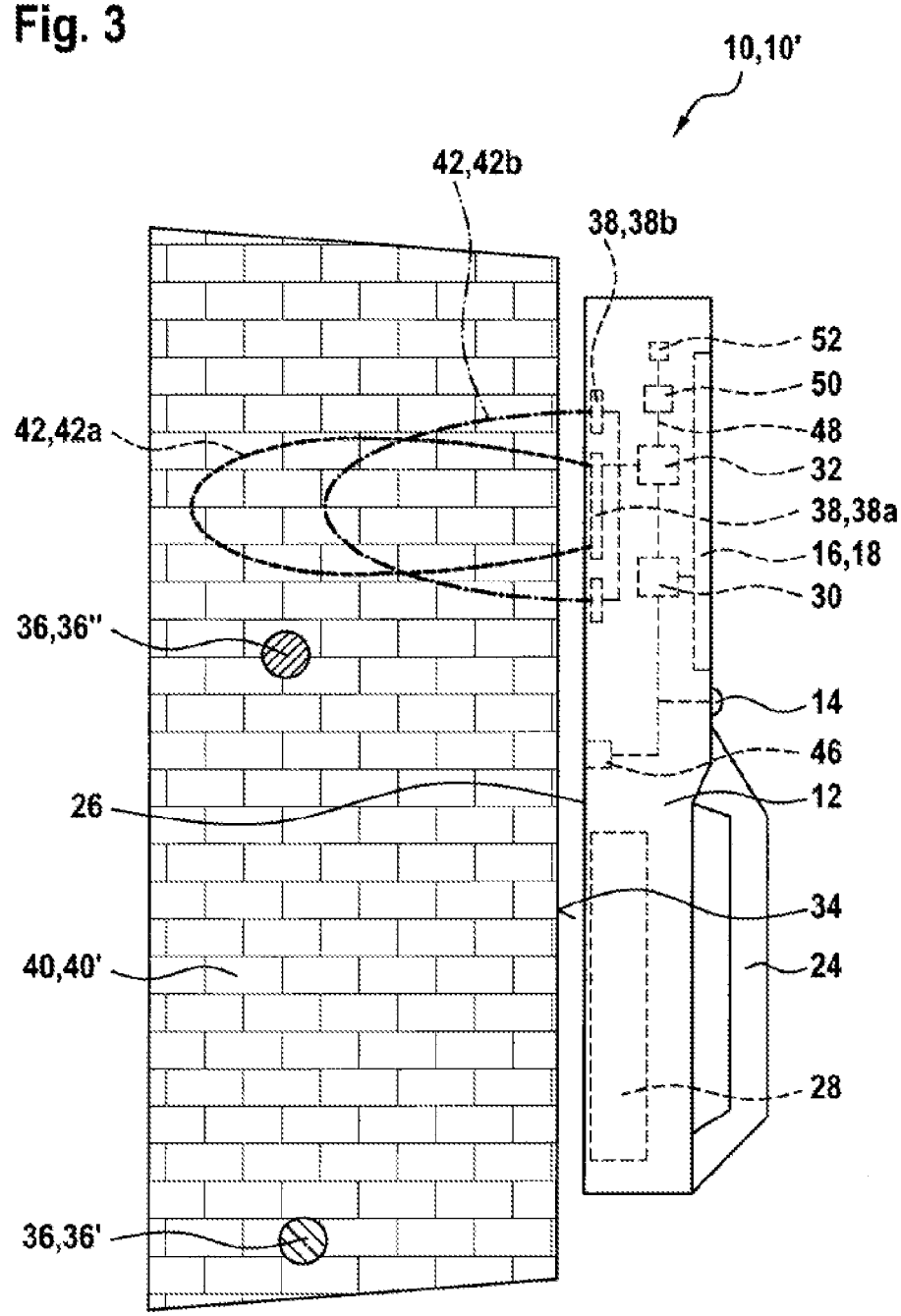
FIG. 3 shows a schematic side view of a configuration of a locating device according to the disclosure.
Figure 4:
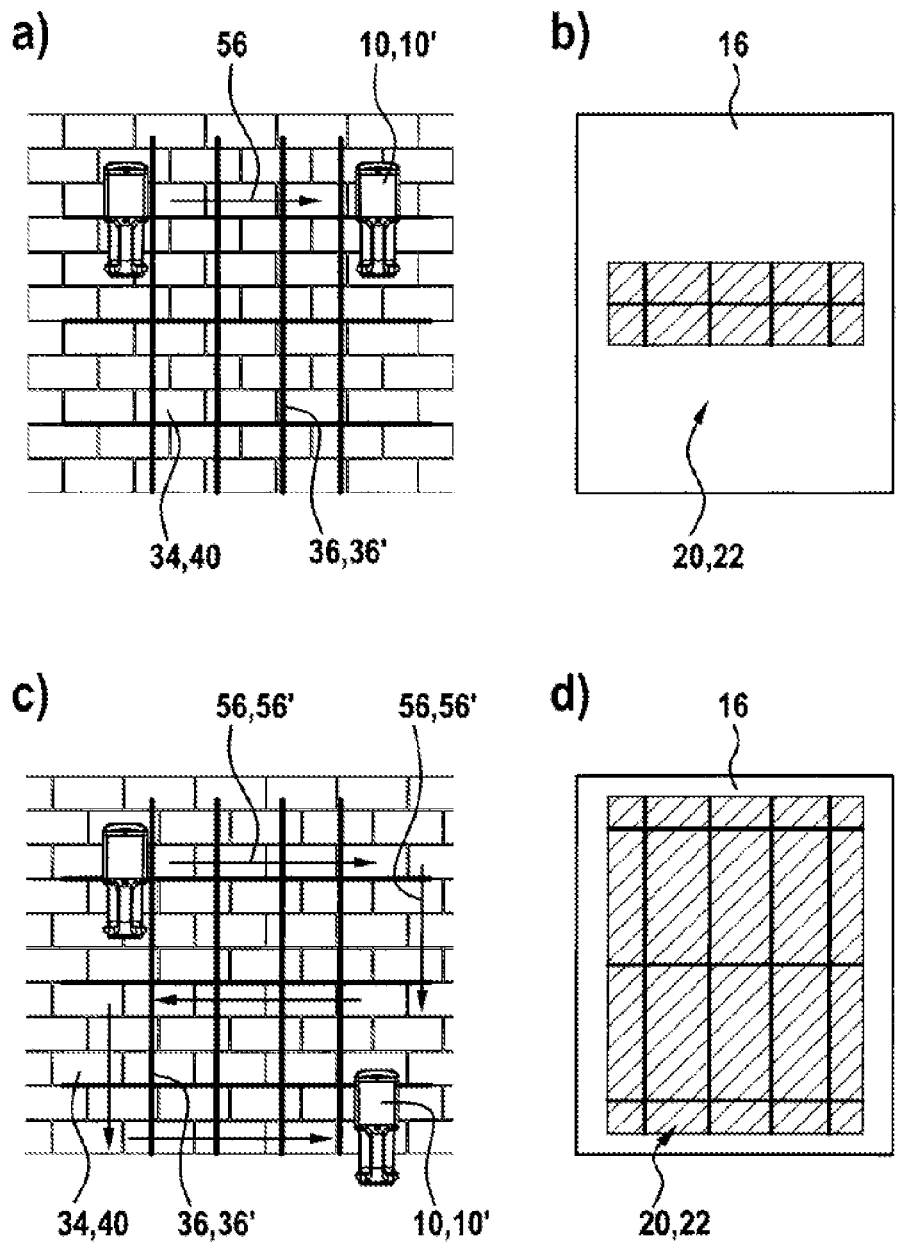
FIG. 4 shows a schematic illustration of an embodiment of the locating device during the application thereof at an article to be examined.

FIG. 1 and FIG. 2 show two views of an exemplary embodiment of an imaging locating device 10 according to the disclosure in a perspective illustration and in a simplified schematic plan view. In FIG. 3, the embodiment of the locating device 10 according to the disclosure is depicted in a simplified schematic side view. The depicted locating device 10 is realized as a hand-held locating device 10'. The locating device 10 with the exemplary configuration has a housing 12, an input apparatus in the form of actuation elements 14, suitable for switching the locating device 10 on and off, and a touch-sensitive display element 16 for starting and configuring a measurement process and for entering operational parameters. The touch-sensitive display element 16 is part of a display apparatus 18 which furthermore serves to display and output operational parameters and/or evaluation results, in particular at least two-dimensional map information items 20 in the form of maps 22, in particular at least two-dimensional maps 22 (cf., in particular, FIG. 4 and FIG. 6).

For transportation purposes and for the guidance thereof, the locating device 10 has a handle 24. The handle 24, the actuating elements 14 and the display element 16 are situated on one housing side of the locating device 10 which typically faces the user when operating the locating device 10.

For the purposes of supplying the locating device 10 with energy, the locating device 10 has a recess on the device rear side 26, i.e. the device side lying opposite to the device side receiving the display element 16 on the rear side, said recess being provided for receiving at least one power-mains-independent energy store 28, in particular batteries or rechargeable accumulators. The locating device 10 presented in an exemplary manner comprises lithium ion accumulators, the high energy and power density of which is advantageously suitable for supplying the locating device 10 with energy. In an alternative embodiment, the energy store 28 may also be housed in the handle 24 of the locating device 10. Preferably, the energy store 28 has a detachable interlocking and/or force-fit connection interface such that the at least one energy store 28 is arrangeable in or on the locating device 10 in a removable and replaceable manner. Moreover, the energy store 28 can be supplied and charged with power from mains power when within and/or outside of the locating device 10.

The input apparatus, consisting of actuating elements 14 and the touch-sensitive display element 16, serves to input operational parameters required and/or expedient for the operation of the locating device 10 by way of a user of the locating device 10. The components of the input apparatus are connected to an evaluation apparatus 30 and/or control apparatus 32 for transferring user inputs. The evaluation apparatus 30 and/or the control apparatus 32 is/are provided to evaluate the user inputs and, in particular, adapt parameters for controlling the locating device and/or for generating and modifying a locating-related information item, in particular a map information item 20. By way of example, a user input allows the locating device and/or a locating process to be started, a color scale and/or an imaging scale of a map 22 displayed by means of the display apparatus 18 to be adapted, one or more at least two-dimensional map information items 20, which are to be depicted by means of the display apparatus 18 in the form of a map 22, to be selected, or the like.

The display apparatus 18 is provided to display a locating information item, in particular to represent and display, preferably represent and display true to scale, at least one portion of a two-dimensional map information item 20 as a map 22. In principle, the display apparatus 18 is also provided to display an entire two-dimensional map 22 in one operating state. The display apparatus 18 is linked to the evaluation apparatus 30 for transferring at least two-dimensional map information items 20, which are provided in the form of multidimensional matrices or the like by the evaluation apparatus 30 and adapted and/or converted by the display apparatus 18 for a display in the form of a map 22 or at least in the form of a portion of a map 22. The display apparatus 18 is provided to convert the at least two-dimensional map information items 20 into a display attribute for pictorial reproduction, such as e.g. a grayscale value level, a grayscale value of a grayscale value curve, a color value level, a color value of a color curve, a brightness level, a brightness value of a brightness curve, a saturation level or a saturation value of a saturation curve and/or a pattern and/or a symbol. The display apparatus 18 has a display element 16 for displaying the map 22. In the present exemplary embodiment, the display element 16 is embodied as a color-capable OLED display. The display apparatus 18, in particular the display element 16, is embodied as part of the locating device 10 and integrated into the housing 12 of the locating device 10. In principle, it is also conceivable for the display apparatus 18, in particular the display element 16, to be embodied separately from the locating device 10 and to be connected thereto by way of a wireless connection for transferring output values, for example by way of a point-to-point ad-hoc connection, a WLAN connection, a Bluetooth connection or the like. In particular, in a further embodiment, the display apparatus 18 may also have further display elements 16', which are embodied separately from the display element 16 for the map 22.

Advantageously, a first at least two-dimensional map information item 20a and/or an at least one further at least two-dimensional map information item 20b, 20c, 20d can be depicted as a map 22 by means of the display apparatus 18 of the locating device 10 (cf., in particular, FIG. 6a to FIG. 6d). To this end, the display apparatus 18 can overlay the first at least two-dimensional map information item 20a and the at least one further at least two-dimensional map information item 20b, 20c, 20d to form a common map 22e, 22f (cf., in particular, FIGS. 6e and 6f). The portion of a map 22 displayed by the display apparatus 18, in particular by the display element 16, has an imaging scale which corresponds to a ratio of extents of the map 22 in the display element 16 to extents of an associated region of an examination surface 34 (cf., in particular, FIG. 4). The imaging scale has an equal imaging scale for a first direction and for a second direction which, in particular, is orthogonal to the first direction. In particular, the display of the at least two-dimensional map 22 is independent of the orientation of the locating device 10 on the examination surface 34 (cf., in particular, FIG. 3). Hence, the depicted map 22 represents objects 36 to be located which are located under the examination surface 34 in a manner true to the position thereof, independently of the orientation of the locating device 10. Preferably, the depicted map 22 is rotated against the direction of the rotational movement in the case of a rotation of the locating device 10 such that the depicted map 22 reproduces the objects 36 to be located which are located under the examination surface 34 in a manner true to the position thereof, even when the locating device 10 is rotated.

Reference is made to the fact that, in the described exemplary embodiment, an at least two-dimensional map information item 20 is converted into a map 22 by means of the display apparatus 18. Within this meaning, the terms "at least two-dimensional map information item" and "map" can be used largely in parallel or synonymously within the meaning of "convertible into one another" in this specific exemplary embodiment.

The display apparatus 18 is furthermore provided for the output or display of further necessary, useful and/or expedient information items, for example for outputting a locating direction, a locating accuracy, operating instructions, an operational menu or the like. The display apparatus 18 furthermore renders it possible to depict an at least two-dimensional map information item 20 as a map 22 having synthetic elements (cf., in particular, map 22d in FIG. 6d). By way of example, such synthetic elements represent lines, boxes, other geometric forms, patterns, symbols or the like.

The locating device 10 has a first locating apparatus 38a and a second locating apparatus 38b, with both locating apparatuses 38a and 38b being provided to detect locating data in respect of objects to be located 32 which are concealed under an examination surface 34. The two locating apparatuses 38a, 38b are housed in the housing 12 of the locating device 10 such that the locating apparatuses 38a, 38b are held and protected by the housing 12 in the assembled state of the locating device 10.

In the shown exemplary embodiment, the first locating apparatus 38a is embodied as a transmission and reception unit for electromagnetic radiation, in particular as an LCR antenna (not depicted in any more detail). The LCR antenna is provided for emitting electromagnetic radiation on the device rear side 26 facing away from a user of the locating device 10. To this end, the first locating apparatus 28 comprises at least one antenna element (not depicted in any more detail) and an antenna controller (likewise not depicted in any more detail) for actuating the LCR antenna. As depicted in the schematic section in FIG. 3, the first locating apparatus 38a, in particular the LCR antenna, emits electromagnetic signals which penetrate into the workpiece 40 to be examined from the device rear side 26, which signals are depicted in the form of a detection region 42*a* (reception lobe) of the first locating apparatus 38*a*. Signals reflected and/or scattered in the interior of the workpiece 40, in particular electromagnetic radiation at least partly reflected by an object 36 to be located which is concealed under the examination surface 34, are detected by means of the antenna of the first locating device 38*a*. Here, electromagnetic properties of the volume arranged below the examination surface 34 are detected, at least in the detection region 42*a* of the first locating apparatus 38*a*. Electromagnetic properties detected by means of the reflected electromagnetic radiation relate, in particular, to an electric or magnetic conductivity or an electric or magnetic susceptibility of the objects 36 to be located which are concealed under the examination surface 34. The first locating apparatus 38*a* is arranged directly behind the housing side in the interior of the housing 12 which faces away from the user when applying the locating device 10. In this manner, the first locating apparatus 38*a* can be positioned advantageously close to the examination surface 34 when applying the locating device 10, in particular when placing the locating device 10 onto an examination surface 34 to be examined. By emitting and receiving a locating signal of the first locating apparatus 38*a*, the first locating apparatus 38*a* determines the distance between the LCR antenna and an object 36 to be located and also information about the existence and lateral position of the object 36 to be located. The locating data relating to the existence and the locating data relating to the distance, in particular locating depth, of objects 36 to be located which are concealed under an examination surface 34 in this case constitute locating data of a first category and of a second category, respectively, of the first locating apparatus 38*a*. From these locating data, it is possible to determine, by way of the evaluation apparatus 30, a first at least two-dimensional map information item 20*a* relating to the existence of objects to be located and a second at least two-dimensional map information item 20*b* relating to the locating depth of objects 36 to be located (cf., in particular, FIGS. 6*a* and 6*b*), respectively as a consequence of an assignment of locating data to position data of the locating device 10 in relation to the examination surface 34. By way of example, it is possible to locate objects to be located, such as reinforcing rods 36', metallic inclusions or the like, in a workpiece 40 to be examined, in particular a wall 40' to be examined, by using the first locating apparatus 38*a*.

In the depicted exemplary embodiment, the second locating apparatus 38*b* is embodied as an AC antenna (not depicted in any more detail), which is provided to detect low-frequency AC voltage, in particular voltage with a frequency of less than 100 kHz, advantageously of less than 10 kHz, particularly advantageously of less than 1 kHz, in a workpiece 40. Preferably, the AC antenna is provided to locate a mains voltage with 50 Hz and/or 60 Hz. To this end, the AC antenna has two electrodes (not depicted in any more detail), which are embodied as metallic, electrically conductive layers, and, furthermore, a control unit (likewise not depicted in any more detail). The control unit serves to actuate and operate the AC antenna. In particular, the second locating apparatus 38*b* has a detection region 42*b*, which, in a manner substantially perpendicular to the device rear side 26 of the locating device 10, extends into the workpiece 40 to be examined. By means of the second locating apparatus 38*b*, in particular the AC antenna, it is advantageously possible to detect AC voltage signals of objects 36 to be located which are concealed under an examination surface 34, in particular of current-conducting lines 36" which are concealed under an examination surface 34. Hence, current-conducting lines 36", in particular AC current-conducting lines 36" are able to be located in a workpiece 40 to be examined, in particular, for example, in a wall 40' to be examined, by means of the second locating apparatus 38*b*. The second locating apparatus 38*b*, in particular the electrodes thereof, is arranged directly behind the housing side, which faces away from the user when applying the locating device 10, in the interior of the housing 12. In this way, it is also possible to position the second locating apparatus 38*b* advantageously closely to the examination surface 34, particularly when placing the locating device 10 onto an examination surface 34 to be examined. An object 36 to be located which is arranged in a region below the examination surface 34, in particular an AC current-conducting line 36", induces or causes an electromagnetic field in the second locating apparatus 38*b*, with it being possible for said electromagnetic field to be detected particularly in comparison with a region which is free from such an object 36 to be examined. The second locating apparatus 38*b* is provided to detect such an electromagnetic field and/or a change of such an electromagnetic field in a continuous value range. These locating data therefore relate to information about the current-conducting properties of objects 36 to be located which are concealed under an examination surface 34 and constitute locating data of a first category of the second locating apparatus 38*b*. As a consequence of assigning the locating data to the position data of the locating device 10 in relation to the examination surface 34 by way of the evaluation apparatus 30, it is possible to determine from these locating data at least one further, third at least two-dimensional map information item 20*c* relating to the locating of current-conducting objects 36 to be located, in particular lines 36" (cf., in particular, FIG. 6*c*). By way of example, it is possible to locate objects 36 to be located, such as electrical lines 36", cables or the like, in a workpiece 40 to be examined, in particular in a wall 40' to be examined, when using the second locating apparatus 38*b*.

The locating device 10 moreover comprises a position sensor 46, which is provided to detect position data of the locating device 10 in relation to the examination surface 34. In an assembled state of the locating device 10, the position sensor 46 is received in the housing wall on the device rear side 26. The position sensor 46 allows the locating device 10 to detect a change in alignment and/or change in position of the locating device 10 in relation to the examination surface 34 of a workpiece 40 to be examined (cf., in particular, FIG. 3). In particular, the position sensor 46 detects a movement of the locating device 10 and a traveled distance and/or direction and therefore renders it possible to relate locating data to a position of the locating device 10, in particular to the examination surface 34. In particular, the position sensor 46 moreover renders it possible to detect a rotation of the locating device 10 about an axis which extends perpendicular in relation to the examination surface 34. In the depicted exemplary embodiment, the position sensor 46 is embodied as an optical displacement transducer which is arranged in the housing wall of the device rear side 26 facing the workpiece 40 to be examined when the locating device 10 is used.

As depicted in FIG. 3, the locating device 10 is positioned with the device rear side 26 in the direct vicinity of the examination surface 34, in particular in contact with the examination surface 34, in a planar fashion in order to locate an object 36 to be located which is concealed under an examination surface 34. Here, the locating device 10 is provided to be guided on and/or over the examination surface 34 by hand. Here, the locating device 10 is positioned with the device rear side 26 in the direct vicinity of the examination surface 34 to be examined, in such a way that the distance between the device rear side 26 and the examination surface 34 is minimized. What this achieves is that the detection regions 42a and 42b may penetrate into the workpiece 40 to be examined from the first locating apparatus 38a and the second locating apparatus 38b, respectively. A change in position of the locating device 10 is detected as a consequence of repositioning, in particular displacing or shifting, of the locating device 10 on the workpiece 40. Corresponding position data are forwarded to the evaluation apparatus 30 for further evaluation. Particularly advantageously, multidimensional, in particular at least two-dimensional, map information items 20 and/or pictorial representations of at least two-dimensional map information items 20 may be generated in the form of at least one map 22 (cf., in particular, FIG. 4) by means of a position-dependent measurement and evaluation of an examination surface 34.

Further components of the locating device 10, in particular the first locating apparatus 38a and the second locating apparatus 38b, the control apparatus 32, the evaluation apparatus 30, and also a data communication interface 50 connected to the control apparatus 32 and/or the evaluation apparatus 30 and a memory apparatus 52, are housed on a carrier element 48 of the locating device 10, in particular a system circuit board or printed circuit board within the housing 12 (see, in particular, FIG. 2 and FIG. 3).

The control apparatus 32 has control electronics comprising means for communicating with the other components of the locating device 10, for example means for open-loop and/or closed-loop control of the first locating apparatus 38a and the second locating apparatus 38b, and means for controlling the locating device 10. In particular, the control apparatus 32 comprises a unit (not depicted in any more detail) comprising a processor unit, a memory unit and an operating program stored in the memory unit.

The evaluation apparatus 30 is connected to the first locating apparatus 38a and the further, second locating apparatus 38b for transferring at least locating data. Moreover, the evaluation apparatus 30 is connected to the position sensor 46 for transmitting position data. The evaluation apparatus 30 has at least one processor and a memory (not depicted in any more detail) with an operating program which is stored thereon and executable. Furthermore, the evaluation apparatus 30 has a signaling connection with the data communication interface 50 and the display apparatus 18, in particular the display element 16. The evaluation apparatus 30 is provided to determine a first at least two-dimensional map information item 20a by assigning locating data of a first category of the first locating apparatus 38a—i.e., the existence of locating data relating to objects 36 to be located which are concealed under an examination surface 34—to position data. Therefore, the first at least two-dimensional map information item 20a relates to the position-resolved information about the existence of objects 36 to be located under an examination surface 34 (cf., in particular, FIG. 6a). Moreover, the evaluation apparatus 30 is provided to determine a further, second at least two-dimensional map information item 20b, which differs from the first at least two-dimensional map information item 20a, by assigning locating data of the second category of the first locating apparatus 38a—i.e., the locating depth of locating data relating to objects 36 to be located which are concealed under an examination surface 34—to position data. The second at least two-dimensional map information item 20b therefore relates to the position-resolved information about the locating depth of objects 36 to be located, i.e., the depth at which objects 36 to be located are concealed under an examination surface 34 (cf., in particular, FIG. 6b). Moreover, the evaluation apparatus 30 is provided to determine a further, third at least two-dimensional map information item 20c by assigning locating data of the second locating apparatus 38b, in particular locating data of the first category of the second locating apparatus 38b—i.e., the existence of locating data relating to AC current-conducting objects 36 to be located which are concealed under an examination surface 34—to position data. Thus, the third at least two-dimensional map information item 20c relates to the position-resolved information about the existence of AC current-conducting objects 36 to be located which are concealed under an examination surface 34 (cf., in particular, FIG. 6c), i.e., in particular, lines 36".

The evaluation apparatus 30 furthermore has evaluation routines for preparing and/or analyzing locating data, in particular closed-loop control routines, open-loop control routines, analysis routines, calculation routines, assignment routines, conversion routines, statistical evaluation routines, filters and the like. Preferably, the evaluation apparatus 30 has evaluation routines which have at least image processing algorithms and spectral filters. By evaluating locating data, it is possible to examine the measurement data and/or measurement signals provided by a locating apparatus 38a, 38b in a targeted manner in respect of information of interest, and so subsequently interpreted and/or prepared locating data, in particular information, e.g. directional information, yes/no information, material information, evaluation information or the like, in respect of objects 36 to be located which are concealed under the examination surface 34 are available. The evaluation apparatus 30 can further determine further at least two-dimensional map information items 20d (cf., in particular, FIG. 6d) by assigning such evaluated locating data from the first locating apparatus 38a and/or the second locating apparatus 38b to position data. Such an at least two-dimensional map information item 20d, which comprises evaluated locating data which has therefore been prepared in a targeted manner, represents a particularly intuitively understandable information item in relation to objects 36 to be located which are concealed under the examination surface 34.

The evaluation apparatus 30 is provided to combine a plurality of at least two-dimensional map information items 20, here using the example of the at least two-dimensional map information items 20a-d, to form a common map information item 20e,f. This combination preferably leads to an accumulation, in particular an overlay and fusion, of the at least two-dimensional map information items 20a-d underlying the combination to a common map information item 20e,f. The common map information item 20e,f preferably contains the locating information contained in the respective underlying at least two-dimensional map information items 20a-d such that an advantageously comprehensive map information item 20e,f is generated. In this manner, it is possible to combine information items relating to locating which are established in different ways. Reference is made to the fact that the at least two-dimensional map information items 20 underlying the combination are selectable, in particular selectable by a user of the locating device 10. In FIGS. 6e and 6f, the at least two-dimensional map information items 20a and 20c, and 20a and 20d are in each case combined to a common at least two-dimensional map information item 20e and 20f, respectively, as exemplary embodiments. Alternatively, or additionally, other combination options are also conceivable, for example a combination of the at least two-dimensional map information items 20a with 20b or 20b with 20c or 20b with 20d or the like.

Evaluation results, in particular at least two-dimensional map information items 20a-c derived from the locating data and position data, preferably also at least two-dimensional map information items 20d derived from evaluated locating data and position data, particularly preferably also at least two-dimensional map information items 20e-f generated by combining a plurality of at least two-dimensional map information items 20a-d, are output by the evaluation apparatus 30 for further processing by the control apparatus 32, either output to the memory apparatus 52 or, for the purposes of transmitting the data, output to the data communication interface 50 or directly to a user of the locating device 10. Here, an output to a user is brought about by means of the display apparatus 18, i.e. by displaying the at least two-dimensional map information item 20a-f in the form of a map 22a-f on the display element 16. The output on the display element 16 is preferably carried out graphically, numerically and/or alphanumerically, for example in the form of a measurement value, a measurement curve, a signal curve, a time curve, as image data, in a gradient display, by means of symbols and in a combination thereof (cf., in particular, FIG. 6). Particularly preferably, provision is made for displaying the at least two-dimensional map information items 20a-f in the form of a map 22a-f.

By way of a high processing rate or display rate, the evaluation apparatus 30 and the display apparatus 18 are provided to lead a user of the locating device 10 to believe that locating data for a region traveled over by the locating device 10 are evaluated immediately, preferably in real time, and provided as map information 20 or depicted as map 22. To this end, the device-internal processing duration by the evaluation apparatus 30 and the display apparatus 18 is less than 2 seconds, preferably less than 1 second, particularly preferably less than 0.5 seconds.

After placing the locating device 10 onto the examination surface 34, the user can move, in particular shift or displace, the locating device 10 along the examination surface 34 during operation. This is indicated in FIGS. 4a and 4c by arrows which indicate a path 56 of repositioning of the locating device 10. In the embodiment depicted in FIG. 4c, this path 56 may correspond to successive partial paths 56' aligned perpendicular to one another. In relation to a wall 40' to be examined, these partial paths 56' may extend e.g. horizontally and vertically. In a preferred, user-friendly and particularly intuitive embodiment, the locating device 10 may also be moved freely over the examination surface 34 (not depicted in any more detail here). Particularly advantageously, a movement along a predetermined, in particular rigid, path 56' is not necessary in this embodiment. Hence, the user may guide the locating device 10 over the examination surface 34 in a freely executable wiping movement and examine the examination surface 34 in a simple and intuitive manner. The free wiping movement of the locating device then results in a free path 56, in particular with an arbitrary configuration, which is independent of a predetermined grid or a predetermined track for the movement or the displacement path. As a consequence of the repositioning, in particular displacing or shifting, of the locating device 10 on the examination surface 34, a change in position of the locating device 10 is forwarded in the form of position data to the evaluation apparatus 30 for further evaluation. By means of a position-dependent measurement and evaluation of locating data, it is possible to successively generate at least two-dimensional map information items 20, as depicted in FIG. 4b and FIG. 4d. Preferably, the at least two-dimensional map information item 20 in the form of a map 22 is generated and displayed in real time, i.e. successively in accordance with the repositioning of the locating device 10 in relation to the examination surface 34. The display apparatus 18 is provided to vary the displayed portion of the map 22 in relation to the examination surface 34 in a manner dependent on position data of the locating device. Furthermore, the display apparatus 18 is provided to scale the displayed portion of the map 22, in particular to scale this in a manner dependent on the position data.

Figure 5:
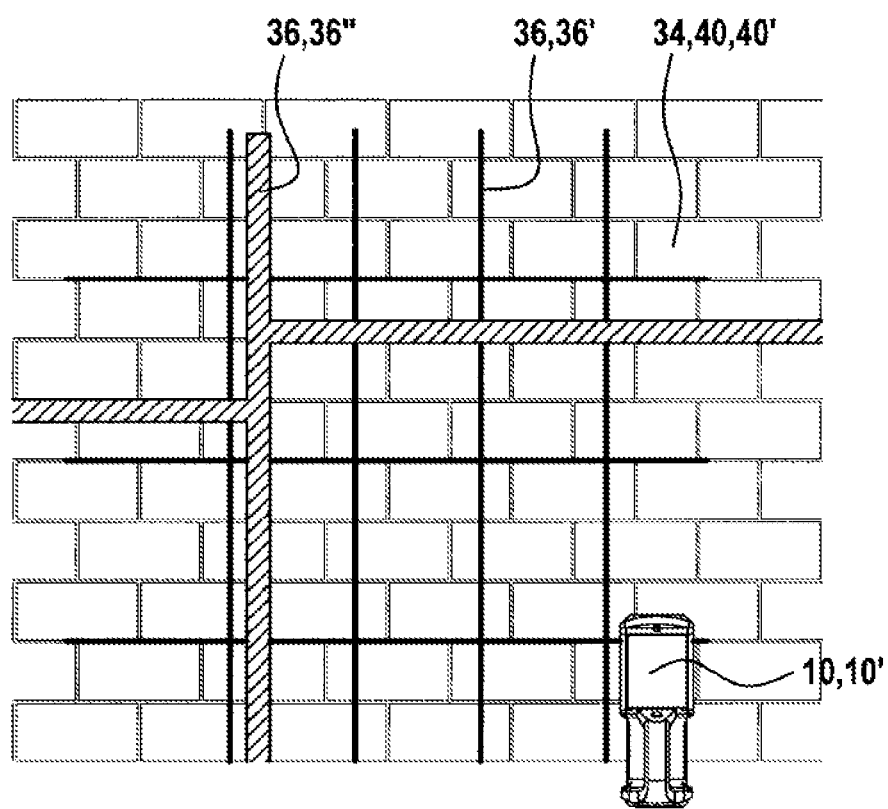
FIG. 5 shows a schematic illustration of an article to be examined, with objects to be located which are concealed under the examination surface thereof.

FIG. 5 depicts an exemplary configuration of a workpiece 40 to be examined on the basis of a typical wall 40'. Concealed in the wall 40' are different objects 36 to be located, in particular reinforcing rods 36' and electrical lines 36". If a user of the locating device 10 wishes to obtain information about the objects 36 to be located which are concealed under the examination surface 34, he places the locating device 10 onto the examination surface 34 and starts a locating process. During the locating process, the user displaces the locating device 10 successively over the examination surface 34 (cf. FIGS. 4a and 4c).

FIG. 6 shows, in the form of maps 22a-f displayed by means of the display apparatus 18, various exemplary embodiments of at least two-dimensional map information items 20a-f contained for the wall 40' depicted in FIG. 5. FIG. 6a and FIG. 6b depict, in the form of maps 22a and 22b, respectively, a first at least two-dimensional map information item 20a relating to the existence of objects 36 to be located and a second at least two-dimensional map information item 20b relating to the locating depth of objects 36 to be located. By using these exemplary maps 22a, 22b, it is possible to locate and gather the position of reinforcing rods 36' concealed in the wall 40', and it is possible to establish a depth of the reinforcing rods 36' in the wall. Reference is made to the fact that the locating apparatus 38a is not sensitive to AC current-conducting lines 36"; these are not contained in the associated at least two-dimensional map information items 20a, 20b and maps 22a, 22b (note: naturally, it is possible to detect the metal of the lines, but this is omitted here for reasons of clarity). In FIG. 6a, the reinforcing rods 36' are identifiable as dark structures in the grayscale display of the map 22a, while the reinforcing rods 36' are identifiable as bright structures in the map 22b. In the map 22a, the grayscale levels correspond to different signal strengths, with which objects to be located are located. The darker the gray, the stronger a locating signal is at this measurement position. In the map 22b, the grayscale levels correspond to different depths, at which objects to be located are located. By way of example, the light gray of the reinforcing rods 36' may correspond to a depth of 8 cm. In general, provision can also be made for a quantitative readout of the information reproduced by means of a map 22a-f to be facilitated by means of a color scale superposed into a map 22a-f (not depicted here in any more detail), in particular by means of a key, in which color values are assigned to quantitative magnitudes.

FIG. 6c depicts, in the form of a map 22c, a third at least two-dimensional map information item 20c relating to the existence of AC current-conducting objects 36 to be located, in particular lines 36", which are concealed under the examination surface 34. Using this exemplary map 22c, the AC current-conducting lines 36", in particular power lines, which are concealed in the wall 40' may be found and the position thereof may be gathered. In FIG. 6c, the lines 36"

are identifiable as dotted structures, with this illustration likewise corresponding to a grayscale illustration of the map 22c. Advantageously, a course of the lines 36" can be gathered particularly easily from the map 22c.

FIG. 6d depicts a fourth at least two-dimensional map information item 20d, which comprises synthetic data. Here, the synthetic data were generated as a consequence of an evaluation of the locating data of the second locating apparatus 38b underlying FIG. 6c by the evaluation apparatus 30, and constitute a simplified representation of the AC current-conducting lines 36" in the form of lines 60. In particular, the centers of the located lines 36" are reproduced by the line 60 by applying an evaluation routine for identifying centers of located structures. Furthermore, danger symbols 58 are integrated into the map 22d, which clearly highlight the risk emanating from the AC current-conducting lines 36" to a user of the locating device 10. In particular, the courses and the connected structure of the AC current-conducting lines 36" can clearly be gathered from the map 22d, and so the display of the at least two-dimensional map information item 20d is reduced to essential, important information. Hence, an interpretation of the locating results by the user of the locating device can be significantly simplified.

FIG. 6e and FIG. 6f depict maps 22e and 22f, respectively, in which two at least two-dimensional map information items are combined in each case. In particular, the at least two-dimensional map information items 20a and 20c underlying the maps 22a and 22c are combined or fused in FIG. 6e. By contrast, the at least two-dimensional map information items 20a and 20d underlying the maps 22a and 22d are combined or fused in FIG. 6f. It should be noted that the map 22e in FIG. 6e represents the locating data—in particular the at least two-dimensional map information items—of the first locating apparatus 38a and the second locating apparatus 38b without an interposed specific evaluation by the evaluation apparatus 30. By contrast, first of all, the locating data of the second locating apparatus 38b—in particular the at least two-dimensional map information item 20d—are included in FIG. 6f by evaluation, for example by means of the algorithm for identifying centers of located structures, in a simplified manner and as a synthetic structure, in particular as a line 60, with danger symbols 58 overlaid thereon. Secondly, it includes the locating data of the first locating apparatus 38a—in particular the at least two-dimensional map information item 20a—without an interposed specific evaluation by the evaluation apparatus 30. The output of the maps 22a-f depicted in FIGS. 6a to 6f to the user of the locating device 10 is carried out on the display element 16 of the display apparatus 18 of the locating device 10.

Furthermore, a multiplicity of further exemplary embodiments of maps 22 are conceivable, said maps relating to at least two-dimensional map information items 20 which contain statements about signal strengths (for example for each individual locating apparatus 38 or in combination for a plurality of locating apparatuses 38), about phases (e.g. a phase of an inductive locating apparatus 38 and/or of a locating apparatus 38 operating by means of radar), about materials, about detected or calculated centers and/or edges of objects 36 to be located, or the like. In particular, in one exemplary embodiment, a further at least two-dimensional map information item 20 may also comprise images of the examination surface 34 recorded by means of a camera as locating apparatus 38. In a further exemplary embodiment, maps 22 are conceivable, said maps being generated by means of combination of at least two-dimensional map information items 20 relating to signal strengths and materials. By way of example, a displayed map 22 could e.g. depict signal strengths in grayscale levels while associateable materials of objects 36 to be located are labeled as colored elements and/or regions. Alternatively, or additionally, there may also be a combination of the at least two-dimensional map information items 20 in such a way that a map 22 is generated which superimposes the signal strengths with a pictorial representation of the examination surface 34 generated by means of a camera. In particular, different transparency values may be used here to label the positions in relation to the examination surface 34 for which at least two-dimensional map information items 20 are already available. Thus, e.g., transparency means that no map information 20 is present at the corresponding position. Alternatively, or additionally, a map 22g is conceivable, in which one at least two-dimensional map information item 20g (not depicted in any more detail) is depicted in combination with a further at least two-dimensional map information item 20h (not depicted in any more detail), wherein the second at least two-dimensional map information item 20h is obtained from the at least two-dimensional map information item 20g by way of high-pass filtering. In this manner, there can advantageously be particular accentuation and/or highlighting of edges in the output map 22g.

Figure 7:
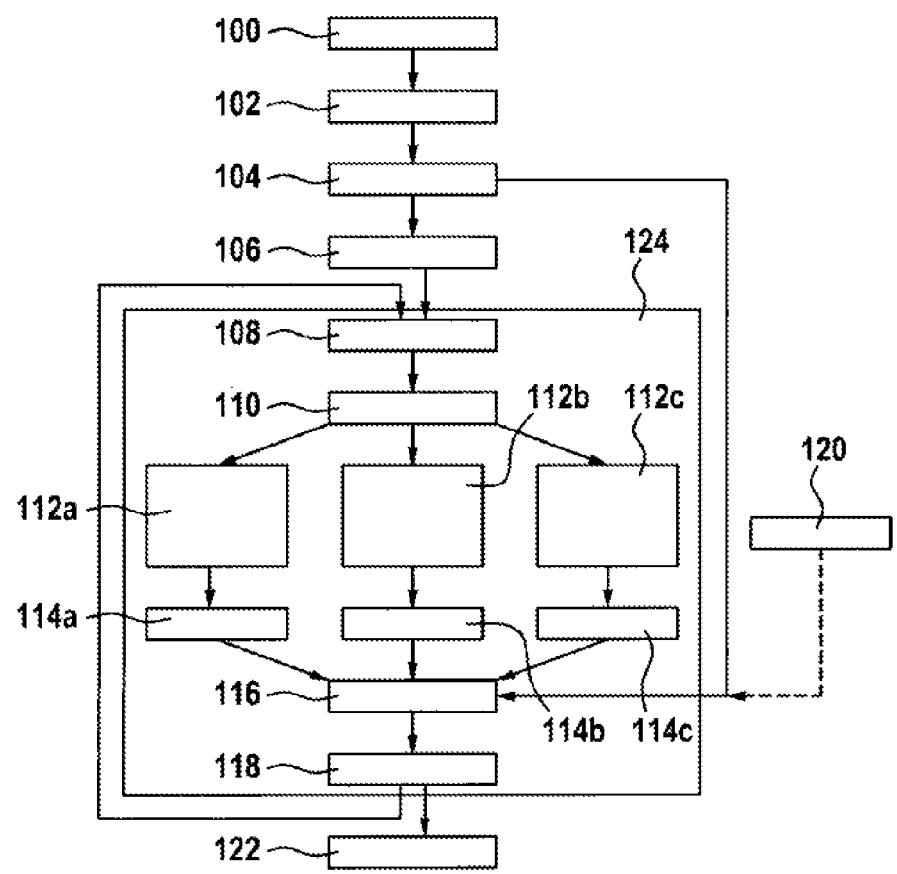
FIG. 7 is a schematic illustration of an embodiment of a method according to the disclosure in a method diagram.

Below, the functionality and operation, in particular the method underlying the operation of the imaging locating device 10, are explained in an exemplary embodiment on the basis of FIG. 7. The description is based on the scenario of a user of the locating device 10 wishing to examine a building wall 40' in respect of concealed objects 36 to be located, in particular e.g. reinforcements 36' and electrical lines 36". When the locating device 10 is switched on by means of an actuation element 14, the locating device 10 initially carries out a calibration of the functional components of the locating device 10 (method step 100). The calibration serves for the startup of the functional components of the locating device 10, inter alia for the readout of the internal memory apparatus 52, the loading of operating routines, and the initialization of the locating apparatuses 38a and 38b, the evaluation apparatus 30 and the position sensor 46. During this startup, the locating device 10 is preferably located freely in the air in the hand of the user, i.e., in particular, it does not have contact with an examination surface 34. Subsequently, the locating device 10 is ready for use and in a standby mode. With the device rear side 26 provided to this end, the user of the locating device 10 places the locating device 10 onto the examination surface 34 of the wall 40' to be examined at any position. In the process, the user of the locating device 10 pushes slightly against the wall 40' in such a way that inadvertent slipping and/or shaking of the locating device 10 on the wall 40' is avoided. The locating device is placed in method step 102. Subsequently, the user of the locating device 10 selects the desired at least two-dimensional map information items 20a-d for output in the form of a common map 22 (like e.g. 22e, 22f in this case) (method step 104). This selection can be modified by the user at all times, indicated by method step 120. Subsequently, the user confirms the start of a locating process by means of an actuation element 14, as a consequence of which the locating apparatuses 38a and 38b, and also the position sensor 46, are put into operation. From now on, the locating device 10 is operational and in an idle mode (method step 106). Now, the user is able to displace the locating device 10 over the examination surface 34 (method step 108), with the repositioning of the locating device 10 being detected by the position sensor 46 (method step 110) and position data being output to the evaluation apparatus 30. At the same time, or quickly in succession, the two locating apparatuses 38a and 38b carry out a locating process in their respective detection region 42a and 42b (method step 112a, 112b, 112c), wherein locating data of two different categories are established in method steps 112a, 112b by means of the first locating apparatus 38a. The established locating data are subsequently forwarded to the evaluation apparatus 30, where they are processed further in method step 114a, 114b, 114c. The further processing is carried out at least within the scope of determining at least two-dimensional map information items 20a-d by assigning locating data to position data. Furthermore, the further processing may also comprise a preparation and/or analysis of locating data, in particular by means of closed-loop control routines, open-loop control routines, analysis routines, calculation routines, assignment routines, conversion routines, statistical evaluation routines, filters and the like. In method step 116, the at least two-dimensional map information items 20a-d determined by the evaluation apparatus 30 are combined to form a common map information item 20e,f. The combined common map information item 20e,f is subsequently forwarded to the display apparatus 18, by means of which it is prepared for display in the form of a map 22e,f by the display element 16 and subsequently output to the user of the locating device 10 (method step 118). In accordance with the map information item of interest selected by the user of the locating device 10 in method step 104 and/or 120, there is a different evaluation of locating data and a different display of the map 22. Thus, it is possible to output to a user of the locating device 10 any one of the maps 22a-f depicted in FIG. 6, and also any combinations thereof, as a common map 22.

The method steps combined in the box (corresponding to the label 124) as a locating process are carried out repeatedly (indicated by an arrow) such that a successively combined map 22 with content selected by the user is output in the case of successive repositioning of the locating device 10 in respect of the examination surface 34. The locating process may be terminated in method step 122 by way of a user input, in particular e.g. if the locating device 10 is switched off.

It should be noted that the disclosure is not restricted to the use of an LCR antenna and an AC antenna. In principle, the locating device 10 for locating the objects 36 to be located which are concealed under an examination surface 34 may also be realized with one or more different locating apparatuses 38, in particular locating apparatuses based on different measurement methods, e.g. a locating apparatus 38 having an inductive sensor, a capacitive sensor, a microwave sensor, a terahertz sensor, an ultrahigh frequency sensor, an x-ray sensor, an infrared sensor, an NMR sensor or the like.

The invention claimed is:

1. An imaging locating device comprising:
at least one display apparatus;
a first locating apparatus configured to detect locating data in relation to objects to be located, wherein the objects are concealed under an examination surface;
a position sensor configured to detect a rotation of the imaging locating device on the examination surface, wherein a position data is based at least in part on the detected rotation; and
an evaluation apparatus configured to determine a first at least two-dimensional map information item by assigning the locating data of a first category from the first locating apparatus to the position data and configured to determine at least one further at least two-dimensional map information item,
wherein the at least one further at least two-dimensional map information item differs from the first at least two-dimensional map information item,
wherein the evaluation apparatus is configured to cause the at least one display apparatus to display at least one of (i) the first at least two-dimensional map information item and (ii) the at least one further at least two-dimensional map information item as a map, and
wherein the evaluation apparatus is configured to cause the first at least two-dimensional map information item and the at least one further at least two-dimensional map information item to be overlaid on the at least one display apparatus to form a common map.

2. The imaging locating device as claimed in claim 1, wherein the evaluation apparatus is configured to determine the at least one further at least two-dimensional map information item by assigning the locating data of at least one further category to the position data.

3. The imaging locating device as claimed in claim 1, wherein the evaluation apparatus is configured to determine the at least one further at least two-dimensional map information item by assigning the locating data from at least one further locating apparatus to the position data.

4. The imaging locating device as claimed in claim 1, wherein the evaluation apparatus is configured to determine the at least one further at least two-dimensional map information item by assigning the evaluated locating data from at least one of (i) the first locating apparatus and (ii) at least one further locating apparatus to the position data.

5. The imaging locating device as claimed in claim 1, wherein the evaluation apparatus is configured to evaluate locating data from at least one of (i) the first locating apparatus and (ii) at least one further locating apparatus by applying at least one of (i) image processing algorithms, (ii) electronic filters and (iii) digital filters.

6. The imaging locating device as claimed in claim 1, wherein the evaluation apparatus is configured to determine the first at least two-dimensional map information item and the at least one further at least two-dimensional map information item in real time.

7. The imaging locating device as claimed in claim 1, wherein the at least one display apparatus is further configured to display at least one of (i) the first at least two-dimensional map information item and (ii) the at least one further at least two-dimensional map information item as a map having synthetic elements, and
wherein the synthetic elements include lines, filled polygons, shaded polygons, partly transparent polygons and/or symbols.

8. The imaging locating device as claimed in claim 1, wherein the evaluation apparatus is configured to combine the first at least two-dimensional map information item and the at least one further at least two-dimensional map information item to form a common map information item.

9. The imaging locating device as claimed in claim 1, wherein the imaging locating device is a hand-held locating device.

10. The imaging locating device as claimed in claim 5, wherein the digital filters are spectral filters.

11. The imaging locating device as claimed in claim 7, wherein the synthetic elements are at least one of lines, filled polygons, shaded polygons, partly transparent polygons and symbols.

12. The imaging locating device as claimed in claim 8, wherein the evaluation apparatus is configured to at least partly combine the first at least two-dimensional map information item and the at least one further at least two-dimensional map information item to form a common map information item.

13. The imaging locating device as claimed in claim 1, further comprising:
a second sensor configured to determine current alignment of the imaging locating device in relation to the examination surface.

14. The imaging locating device of claim 1, further comprising an input apparatus configured to enable a user to manually select and/or adjust elements of the first at least two-dimensional map information item and the at least one further at least two-dimensional map to be overlaid in the common map.

15. The imaging locating device of claim 1, wherein elements of the first at least two-dimensional map information item and the at least one further at least two-dimensional map to be overlaid in the common map are selectable and/or adjustable by the evaluation apparatus automatically.

16. A method for operating an imaging locating device, comprising:
determining a first at least two-dimensional map information item using an evaluation apparatus of the locating device, wherein the determination of the first at least two-dimensional map information item includes:
(i) locating, using the first locating apparatus, objects to be located as locating data, the objects being concealed under an examination surface;
(ii) detecting, using a position sensor, a rotation of the imaging locating device on the examination surface;
(iii) determining a position data based at least in part on the detected rotation; and
(iv) assigning the locating data of a first category from the first locating apparatus to the position data to determine the first two-dimensional map information item;
determining at least one further at least two-dimensional map information item using the evaluation apparatus, wherein the at least one further at least two-dimensional map information item differs from the first at least two-dimensional map information item; and
displaying at least one of the first at least two-dimensional map information item and the at least one further at least two-dimensional map information item on at least one display apparatus,
wherein the evaluation apparatus is configured to cause the first at least two-dimensional map information item and the at least one further at least two-dimensional map information item to be overlaid on the at least one display apparatus to form a common map.

17. An imaging locating device comprising:
a first locating apparatus configured to detect locating data in relation to objects to be located, wherein the objects are concealed under an examination surface;
a position sensor configured to detect position data of the locating device in relation to the examination surface; and
an evaluation apparatus configured to determine a first at least two-dimensional map information item by assigning the locating data of a first category from the first locating apparatus to the position data and configured to determine at least one further at least two-dimensional map information item,
wherein the at least one further at least two-dimensional map information item differs from the first at least two-dimensional map information item,
wherein the position sensor or another sensor in the imaging locating device is configured to detect a rotation of the imaging locating device in any direction, the position data being based at least in part on the detected rotation,
wherein the first locating apparatus includes an inductive sensor with a harmonic excitation field,
wherein an output signal of the inductive sensor has an amplitude and a phase which are each dependent on an excitation frequency of the harmonic excitation field, and
wherein the first category of the locating data is the amplitude of the output signal and the second category of the locating data is the phase of the output signal.

* * * * *